US012001470B2

(12) United States Patent
Culhane et al.

(10) Patent No.: US 12,001,470 B2
(45) Date of Patent: *Jun. 4, 2024

(54) DOCUMENT ELIMINATION FOR COMPACT AND SECURE STORAGE AND MANAGEMENT THEREOF

(71) Applicant: DG IP LLC, Denver, CO (US)

(72) Inventors: Theodore Daniel Culhane, Denver, CO (US); Daniel James Culhane, Denver, CO (US); Brendan Haskins, Westminster, CO (US)

(73) Assignee: DG IP LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,757

(22) Filed: Nov. 14, 2022

(65) Prior Publication Data

US 2023/0073475 A1     Mar. 9, 2023

Related U.S. Application Data

(63) Continuation of application No. 16/131,198, filed on Sep. 14, 2018, now Pat. No. 11,507,612.
(Continued)

(51) Int. Cl.
*G06F 16/35* (2019.01)
*G06F 16/178* (2019.01)
(Continued)

(52) U.S. Cl.
CPC ........ *G06F 16/353* (2019.01); *G06F 16/1794* (2019.01); *G06F 16/316* (2019.01); *G06F 16/38* (2019.01); *G06Q 50/18* (2013.01)

(58) Field of Classification Search
CPC .. G06F 16/353; G06F 16/1794; G06F 16/316; G06F 16/38; G06F 40/205; G06Q 50/18; G06Q 10/10
See application file for complete search history.

(56) References Cited

U.S. PATENT DOCUMENTS

| | | |
|---|---|---|
| 7,593,995 B1 | 9/2009 | He et al. |
| 7,664,821 B1 | 2/2010 | Ancin et al. |
| (Continued) | | |

OTHER PUBLICATIONS

Official Action for U.S. Appl. No. 16/131,198, dated Jun. 15, 2020 17 pages.
(Continued)

*Primary Examiner* — Cam Y T Truong
(74) *Attorney, Agent, or Firm* — Sheridan Ross PC

(57) ABSTRACT

Documents, such as those that may or will be the subject of a litigation, may be managed by automatically determining that a document, such as an email or other communication, is privileged or producible such that superfluous documents may be removed to improve data storage and reduce the burden on storage, processing, and communication resources. Additionally, documents such as emails may comprise attached or embedded documents (e.g., attachments) which may be similarly or independently classified from their associated email. After determining privilege, such as via metadata associated with a sender/receiver of an email, similarly categorized documents may be grouped for presentation and/or storage. The documents may be indexed, such as by entries within a production log, to further facilitate accurate production and management of non-privileged documents, as well as, the exclusion of privileged documents. Documents not required for production may be indexed and/or purged from storage.

20 Claims, 31 Drawing Sheets

Related U.S. Application Data

(60) Provisional application No. 62/559,323, filed on Sep. 15, 2017.

(51) Int. Cl.
*G06F 16/31* (2019.01)
*G06F 16/38* (2019.01)
*G06Q 50/18* (2012.01)

(56) References Cited

U.S. PATENT DOCUMENTS

| | | |
|---|---|---|
| 8,635,207 B2 | 1/2014 | Marlin |
| 9,418,144 B2 | 8/2016 | Sperling et al. |
| 9,619,556 B1 | 4/2017 | Ilkal et al. |
| 9,779,094 B2 | 10/2017 | Kumar et al. |
| 10,706,233 B2 | 7/2020 | Cookson et al. |
| 2005/0235146 A1* | 10/2005 | Douceur ............... H04L 9/3236 713/165 |
| 2008/0120209 A1 | 5/2008 | Krolczyk et al. |
| 2008/0288322 A1 | 11/2008 | Kennedy et al. |
| 2009/0177618 A1* | 7/2009 | Schneider ............... G06F 16/93 |
| 2010/0077301 A1 | 3/2010 | Bodnick et al. |
| 2012/0192286 A1* | 7/2012 | Messing ............... G06F 16/353 726/27 |
| 2013/0346361 A1* | 12/2013 | Hashimoto ............. G06F 16/16 707/808 |
| 2014/0324894 A1 | 10/2014 | Roman |
| 2015/0095430 A1 | 4/2015 | Kaushik et al. |
| 2015/0261732 A1 | 9/2015 | Kim et al. |
| 2016/0219004 A1 | 7/2016 | Erez et al. |
| 2016/0350269 A1 | 12/2016 | Nakashima |
| 2017/0213044 A1 | 7/2017 | Olson et al. |
| 2019/0087489 A1 | 3/2019 | Culhane et al. |

OTHER PUBLICATIONS

Official Action for U.S. Appl. No. 16/131,198, dated Feb. 8, 2021 18 pages.
Official Action for U.S. Appl. No. 16/131,198, dated Dec. 24, 2021 22 pages.
Notice of Allowance for U.S. Appl. No. 16/131,198, dated Oct. 18, 2022 19 pages.
Document Locator. Feature Datasheet > Electronic Forms [online]. Columbiasoft Corporation, Portland, Oregon, USA, 2014 [retrieved on Sep. 28, 2023]. Retrieved from the Internet: <URL: https://www.documentlocator.com/downloads/docs/datasheets/ds-Forms.pdf>.
Document Locator. Feature Datasheet > Electronic Forms. Columbiasoft Corporation, 2011, Portland, Oregon, USA.

* cited by examiner

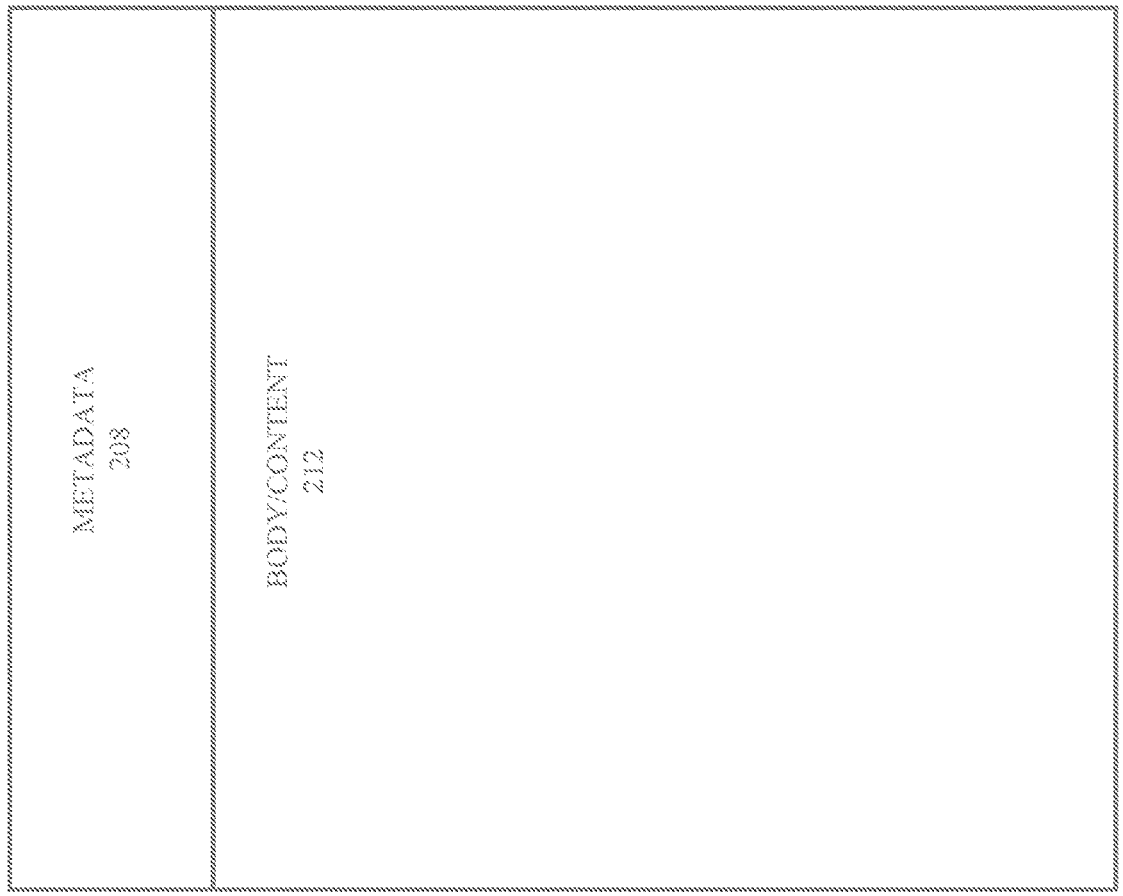
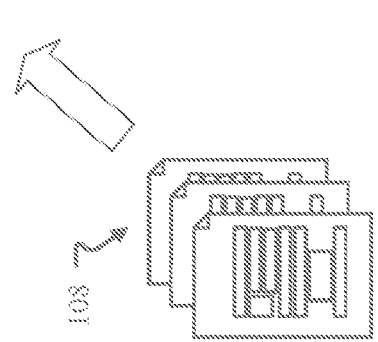
FIG. 2

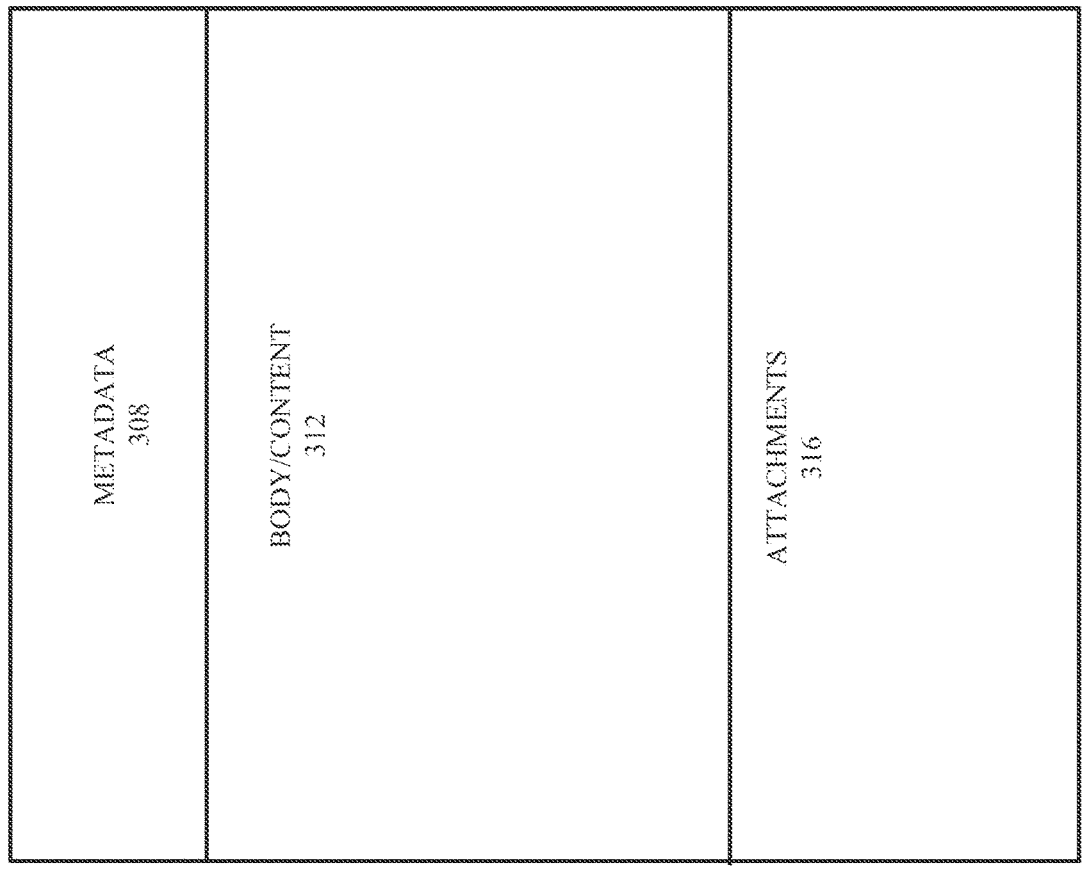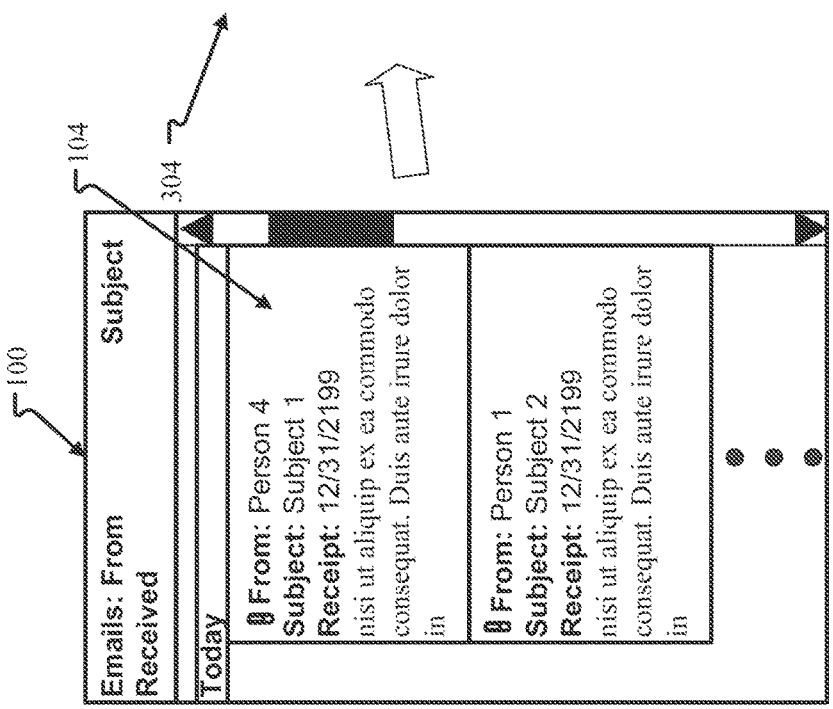
FIG. 3

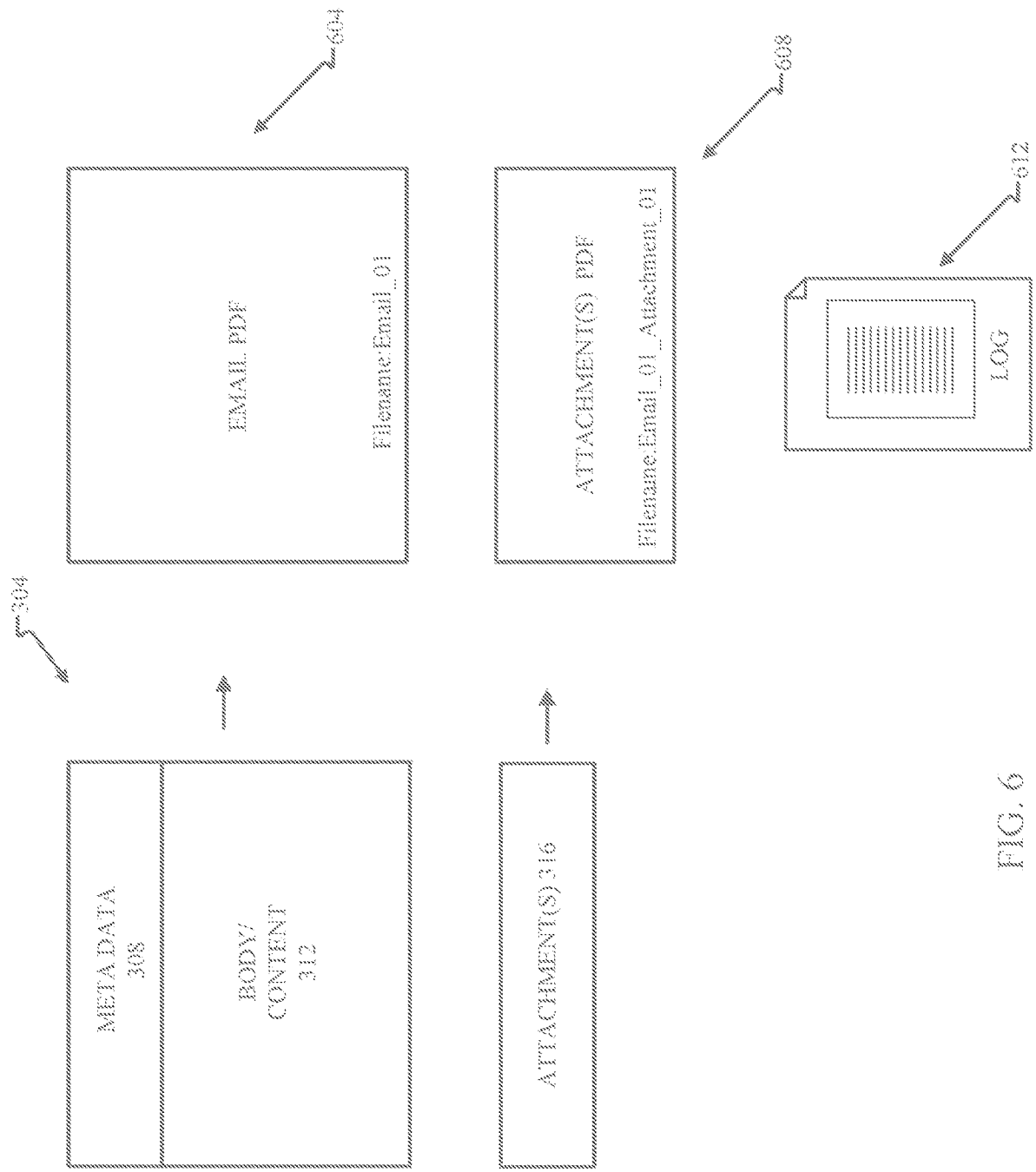

| ADDRESS | PRIVILEGE LABEL | NAME |
|---|---|---|
| Sort by: Email Address | | |
| EMAIL_ADDRESS 1 | Adversary | Name One |
| EMAIL_ADDRESS 2 | Client | Name Two |
| EMAIL_ADDRESS 3 | Attorney | Name Three |
| EMAIL_ADDRESS 4 | Consultant | Name Four |
| EMAIL_ADDRESS 5 | Third-Party | Name Five |
| EMAIL_ADDRESS 6 | Adversary | Name Six |
| EMAIL_ADDRESS 7 | Attorney | Name Seven |
| EMAIL_ADDRESS 8 | Third-Party | Name Eight |
| EMAIL_ADDRESS 9 | Attorney | Name Nine |

FIG. 7

| FROM | DATE ▼ | PRIVILEGE WEIGHTED CATEGORY | CONFIRMED | CONFIDENTIAL |
|---|---|---|---|---|
| ▲ Sort by: Date | | | | |
| ⊚ EMAIL_ADDRESS_01 | 2/11/2017 2:40 PM | NON-PRIVILEGED (GREEN) | ☒ | ☒ |
|    EMAIL_01_ATTACHMENT_01 | | NON-PRIVILEGED (GREEN) | ☒ | ☒ |
|    EMAIL_01_ATTACHMENT_02 | | NON-PRIVILEGED (GREEN) | ☒ | ☒ |
| ⊚ EMAIL_ADDRESS_02 | 2/10/2017 8:44 AM | LIKELY PRIVILEGED (ORANGE) | ☒ | ☒ |
| ⊚ EMAIL_ADDRESS_03 | 2/9/2017 2:13 PM | PRIVILEGED (RED) | ☒ | ☒ |
|    EMAIL_03_ATTACHMENT_01 | | PRIVILEGED (RED) | ☒ | ☒ |
| ⊚ EMAIL_ADDRESS_04 | 2/2/2017 2:23 PM | NON-PRIVILEGED (GREEN) | ☒ | ☒ |

FIG. 8

| # of Emails | Email | Client | Attorney | Adverse | 3rd Party |
|---|---|---|---|---|---|
| 81 | EMAIL_ADDRESS 1 | ▨ | ☐ | ☐ | ☐ |
| 80 | EMAIL_ADDRESS 2 | ▨ | ☐ | ☐ | ☐ |
| 32 | EMAIL_ADDRESS 3 | ☐ | ▨ | ☐ | ☐ |
| 30 | EMAIL_ADDRESS 4 | ☐ | ☐ | ▨ | ☐ |
| 30 | EMAIL_ADDRESS 5 | ☐ | ☐ | ☐ | ▨ |
| 29 | EMAIL_ADDRESS 6 | ▨ | ☐ | ☐ | ☐ |
| 28 | EMAIL_ADDRESS 7 | ☐ | ☐ | ▨ | ☐ |
| 26 | EMAIL_ADDRESS 8 | ☐ | ▨ | ☐ | ☐ |

FIG. 19

```
                                                    ~2000
Order by    Filter by Prediction  ~2004  Filter by Selected      Search Email Attributes  ~2008
[Date Descending ▼]  Category:              Category:                                              ~2020
  ~2010        [Show All ▼]  ~2012     [Show All ▼]  ~2006     CC/BCC   ~2018      Note
Subject/File Name    Date Sent/Modified   From     To  ~2016
                                           ~2014

Subject 16    10-27-2017    Email_address 1   Email_address 2   Email_address 5   [Enter note]
              11:58AM                         Email_address 3
                                              Email_address 4

~2022                      Attachments:                 ~2026
                                      Document 1.doc             [Enter note]
                                      Document 2.xls             [Enter note]

Subject 13    10-27-2017    Email_address 6   Email_address 7   Email_address 10  [Enter note]
              11:58AM                         Email_address 8
                                              Email_address 9

~2024                      Attachments:
                                      Document 3.doc             [Enter note]
                                      Document 4.docx            [Enter note]

FIG. 20A
```

DOCUMENT ELIMINATION FOR COMPACT AND SECURE STORAGE AND MANAGEMENT THEREOF

CROSS REFERENCE TO RELATED APPLICATIONS

This application is a continuation of, and claims priority to, U.S. patent application Ser. No. 16/131,198 filed on Sep. 14, 2018, which in turn claims priority to Provisional Patent Application No. 62/559,323, filed on Sep. 15, 2017, each of which are incorporated herein by reference in their entirety.

FIELD OF THE INVENTION

The systems and methods relate to generating discovery documents and a privilege log based on electronic files and emails and elimination of unneeded documents from storage.

BACKGROUND

Document management is a challenging aspect of pre-litigation activities. Litigants are often required to produce all documentation regarding a particular litigation topic, however, not all documents are produced due to privilege, usually attorney-client privilege. However, it is not sufficient to merely omit such documents, as an exception to the privilege may be invoked that may require a privileged document to be produced. Rather privileged documents must be identified so that both parties and the court is aware of the existence of the documents, whether or not the documents are produced in discovery or as a court exhibit.

Litigations may produce large volumes of documents, each of which must be produced or logged with a claim to privilege. To incorrectly claim privilege, when none is entitled, or to omit such a claim, when rightly justified, may have serious consequences. The management of such documents is challenging and makes a significant contribution to the cost and availability of litigation, whether the documents are paper or electronic, such as emails.

SUMMARY

These and other needs are addressed by the various embodiments and configurations of the present invention. The present invention can provide a number of advantages depending on the particular configuration. These and other advantages will be apparent from the disclosure of the invention(s) contained herein.

With respect to certain embodiments disclosed herein, a system, device, or platform is described which is designed to expedite and facilitate electronic document production in litigation, especially email production. The system processes and parses emails and electronic files to automate:

Sorting and formatting emails for production

Capturing email attachments, like Word documents, Excel spreadsheets, and other files Converting emails and attachments to PDFs Parsing metadata and applying general concepts of attorney-client (and other) privileges to make initial privilege recommendations Facilitating privilege review, allowing final determination of privilege and/or confidentiality by user Preparing privilege log and "production log" per user's final determination Adding Bates numbers and naming files for production Delivering production-ready, Bates-stamped files and complete privilege log; also delivers an indexed, and optionally, hyperlinked "production log" for internal use to quickly search and retrieve produced documents and emails; also delivers complete set of Bates-stamped privileged files, indexed and optionally hyperlinked to privilege log, for internal use and to enable attorneys to immediately respond to challenges to claims of privilege.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium. Executable code, for execution by a processor, is not an unconstrained, abstract set of commands written down by a programmer, but rather "machine code" committed to the memory and selected from the specific machine language instruction set, or "native instructions," designed into the hardware processor(s). Each native instruction is a discrete code recognized by the processing architecture and can specify particular registers for arithmetic, addressing, or control functions. Complex operations are "built up" by combining two or more heterogeneous and/or homogeneous simple native instructions.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 2 depicts additional details of the electronic files of FIG. 1 in accordance with embodiments of the present invention;

FIG. 3 depicts additional details of the email console and individual emails in accordance with embodiments of the present invention;

FIG. 6 depicts details of a resulting document based on the reconstituted email of FIG. 5 in accordance with embodiments of the present disclosure;

FIG. 7 depicts details relating to classifying email addresses for use with an automated privilege rule algorithm in accordance with embodiments of the present disclosure;

FIG. 8 depicts details relating to applying a privilege weighted category to one or more emails in accordance with embodiments of the present disclosure;

FIG. 19 depicts details relating to classifying email addresses for use with an automated privilege rule algorithm in accordance with embodiments of the present disclosure;

FIGS. 20A-20B depicts details relating to applying a privilege weighted category to one or more emails in accordance with embodiments of the present disclosure;

DETAILED DESCRIPTION

Figure 1:
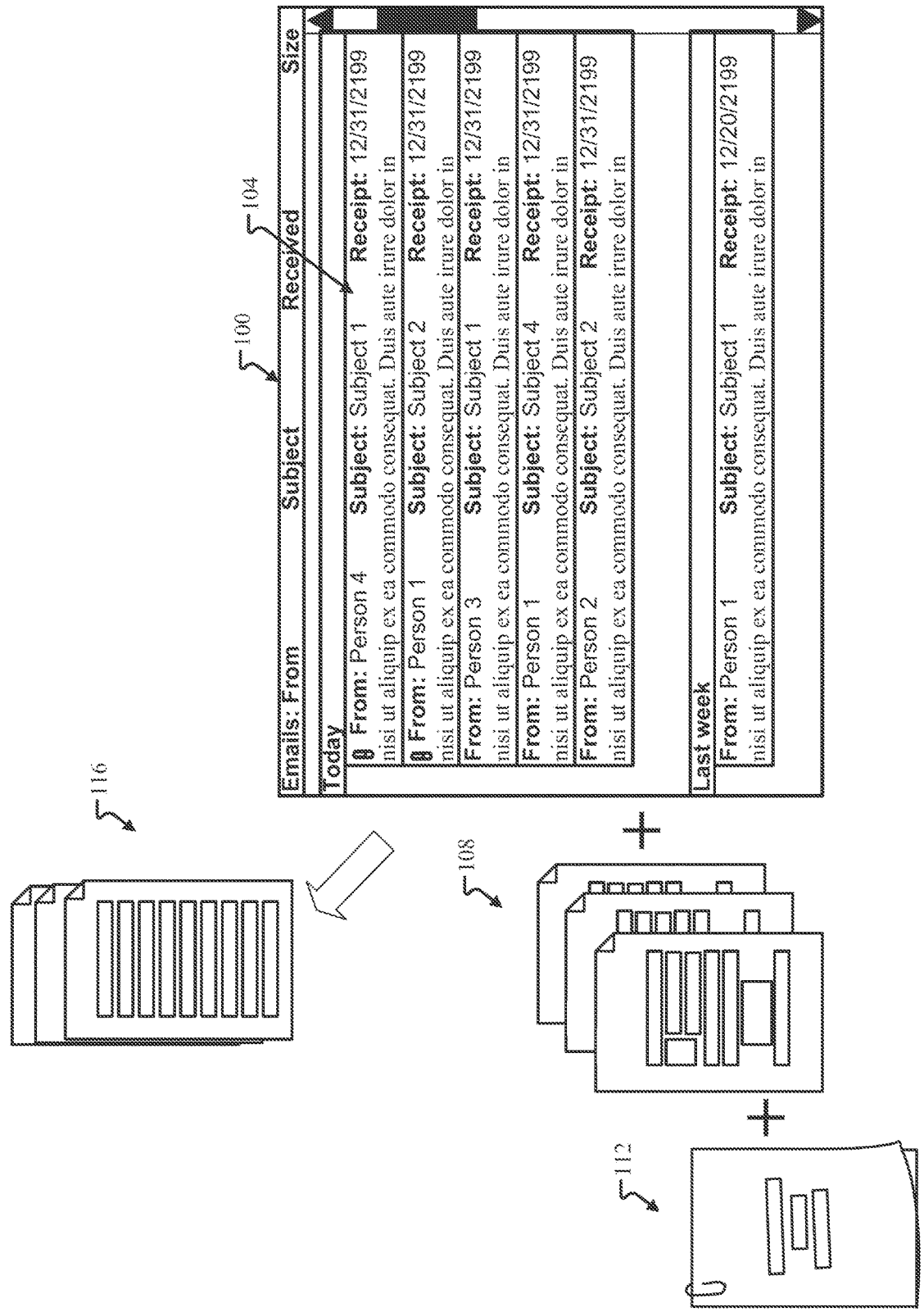
FIG. 1 depicts details of one or more components involved in a discovery document and privilege log generation procedure in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The disclosure herein is illustrated below in conjunction with a discovery document and privilege log generation system and method in accordance with embodiments of the present disclosure. Although well suited for use with various electronic documents, such as emails, email attachments, portable document formats, spreadsheet documents, and the like, the embodiments of the disclosure are not limited to a use with any particular type of email system document format and are not limited to a specific configuration of system elements. Those skilled in the art will recognize that the disclosed techniques may be utilized and implemented to generate discovery documents and privilege logs from a variety of different sources.

While the disclosure is primarily directed to emails, it should be appreciated that in other embodiments, the source of the communication may be in a form different from emails and the electronic communication documents may comprise social media message (e.g., Facebook Messenger), "tweet" on Twitter, posting, instant message, or other form electronic communication that may be, or be converted to, an electronic document.

The exemplary systems and methods of this invention will also be described in relation to software, modules, and associated hardware. However, to avoid unnecessarily obscuring the present invention, the following description omits well-known structures, components, and devices that may be shown in block diagram form or are otherwise summarized. It should also be appreciated that a description, with respect to one implementation type (e.g., a module), is an embodiment wherein other implementation types (e.g., circuits) are utilized are also contemplated and may be utilized without departing from the scope of the disclosure herein, similarly, unless otherwise specified, one embodiment of an implementation may be applied to another embodiment of a different form of software and/or hardware (e.g., client-only, client-server, software-as-a service (SAS), distributed software (e.g., "cloud" implementation, etc.)).

In one embodiment, a method for document compaction is disclosed, comprising: receiving a set of electronic documents, wherein one or more electronic documents includes an attached electronic document; extracting and storing metadata associated with each electronic document of the set of electronic documents; parsing the metadata to extract information identifying a sender and a receiver; reconstructing and converting each electronic document of the set of electronic documents into a first format, wherein an ordering of the electronic documents maintains an ordered relationship between the one or more electronic document and the attached electronic document; classifying each electronic document of the set of electronic documents as privileged or producible based on the previously extracted and stored metadata; grouping similar electronic documents in the first format based on a privilege and producibility classification; and providing the grouping of documents, together with one or more document logs identifying each document in the grouping of documents, to a user.

In another embodiment, a method for document management is disclosed, comprising: receiving an electronic document; extracting and storing metadata associated with the electronic document; reconstructing and converting the electronic document into a first format; classifying the electronic document as one of privileged or producible based on the previously extracted and stored metadata; and providing the document, together with a document log identifying the electronic document, to a user.

In another embodiment, a system for document management is disclosed, comprising: a processor with a communication interface; a data repository accessible, via the communication interface, to the processor; wherein the processor: receives an electronic document; extracts and stores metadata associated with the electronic document; reconstructing and converting the electronic document into a first format; classifies the electronic document as one of privileged or producible based on the previously extracted and stored metadata; and provides the document, together with a document log identifying the electronic document, to a display device for viewing by a user.

The discovery document and privilege log generation system operates on a set of electronic documents, (e.g., email documents), extracts and stores metadata associated with each electronic document of the set of electronic documents, reconstructs the electronic document, including maintaining an effective ordering of related electronic documents, converts the electronic document into a first format, classifies, to a varying degree, each electronic document of the set of electronic documents as to whether a document is privileged or producible based on the extracted metadata, groups similar electronic documents based on the degree of privilege and producibility, places a unique "Bates" number electronically on each page of each document, and provides the grouping of documents, together with one or more document logs, to a user. Accordingly, the discovery document and privilege log generation system provides a system and method to overcome the technical challenges associated with generating producible documents and document logs throughout one or more phases of litigation. That is, the discovery document and privilege log generation system is an online platform designed to expedite and facilitate electronic document production in litigation, especially with respect to email production.

More specifically, the discovery document and privilege log generation system processes and parses emails and electronic files to sort and format emails for production by capturing email attachments, like Word documents, Excel spreadsheets, and other files, and converts emails and attachments to PDFs. While PDFs are a common document format, in other embodiments, other document formats may be used that are immutable, with respect to the document itself, but which may be annotated, such as via redactions, Bates numbers, or other markings. The annotations may or may not be immutable once added. The discovery document and privilege log generation system parses metadata and applies general concepts of attorney-client (and other) privileges to make initial privilege recommendations, thereby facilitating privilege review and allowing final determination of privilege and/or confidentiality by a user. Moreover, the discovery document and privilege log generation system prepares privilege logs and "production logs" per a user's final determination and further adds bates numbers while naming files for production. Accordingly, the discovery document and privilege log generation system delivers production-ready, Bates-stamped files together with a complete privilege log, as well as a "production log," i.e., a description of each document produced (as opposed to withheld under a claim of privilege). Accordingly, the "production log" may be indexed and hyperlinked for internal use to quickly search and retrieve produced documents and emails.

In another embodiment, the documents may be stored, processed, and/or transmitted following conversion to the first format absent privileged documents or privileged portions of documents. Accordingly, systems utilized may have a reduced burden by avoiding further storing, processing, and/or transmitting of documents that are required for production. In another embodiment, performing a conversion factor at one time, which may utilize one computer, service, etc., and converting documents into a reduced, or even one, number of file types reduces the overhead required for subsequent computers to have, execute, and maintain all of the various applications, plug-ins, utilities, etc. for reading a variety of file formats. For example, one system may utilize the appropriate software to convert emails, Word, Excel, images, drawing, text, etc., files into a single format, such as PDF. As a result, all subsequent devices, e.g., computers, laptops, mobile computing devices, etc., need only have a PDF view in order to view all documents, regardless of their original format. As a result, document discovery systems may require less processing overhead by allowing a single device to perform the conversion processes.

FIG. 1 depicts details of one or more components involved in a discovery document and privilege log generation process in accordance with at least some embodiments of the present disclosure. One or more sources of electronic information, such as one or more emails 104 from a depicted email console 100, one or more electronic file documents 108, and/or one or more scanned electronic documents 112 depicting a physical document may be obtained, gathered, sorted, and/or grouped into one or more deliverables 116 including privileged and production documents together with one or more privilege and production logs. As one example, emails 104 from the email console 100 may be grouped into one or more folders for processing, whereby a privilege algorithm may preliminarily tag each email, including an attachment, as either a privileged or produced document. The emails 104 and attachments may be converted into a user-friendly format, such as a portable document format (PDF), Bates stamped, and then delivered to a user. The user-friendly format may further include hyperlinked production and privilege logs allowing attorneys to immediately respond to challenges to claims of privilege, and/or to quickly search an index for a desired record and quickly retrieve that record.

As depicted in FIG. 2, an electronic document 204, such as an electronic document 108 that is not associated with an email, generally includes a metadata portion 208 as well as body/content portion 212. The metadata portion 208 may include document properties such as title, author, subject, creation date, modified date, and/or keywords that may have been set by a user who created the document in a source application, such as Word, Excel, PowerPoint, or by a user who created a PDF document. The metadata portion 208 may include additional metadata that includes information that may not be visible on the face of the document 204, but otherwise describes or provides details related to images, photographs, tables, and charts for example. The body portion 212 of the electronic document 204 may include the actual information intended to be conveyed by the electronic document 204. For example, data, text, images, and/or graphics may be included in the body portion 212.

As depicted in FIG. 3, an email 304 corresponding to one or more emails 104 of the email console 100, may include a metadata portion 308, body/content portion 312, and one or more attachments 316. Similar to the metadata portion 208 of the electronic document 204, the metadata portion 308 of the email 304 may include information about the email, such as information of the To:, CC:, From:, Subject:, Date:, Size:, Attachment fields. Of course, the metadata portion 308 may include additional metadata as well. The body/content portion 312 may include the actual information intended to be conveyed by the email 304, such as the body of the email. The body/content portion 312 may be in a general text format, or may be formatted in accordance with one or more specifications, such as a hypertext markup language (HTML). The attachments 316 may include one or more file attachments, such an electronic document 204. In some instances, the body/content portion 312 may include one or more electronic documents 204, such as an image, logo, signature or otherwise.

Figure 4:
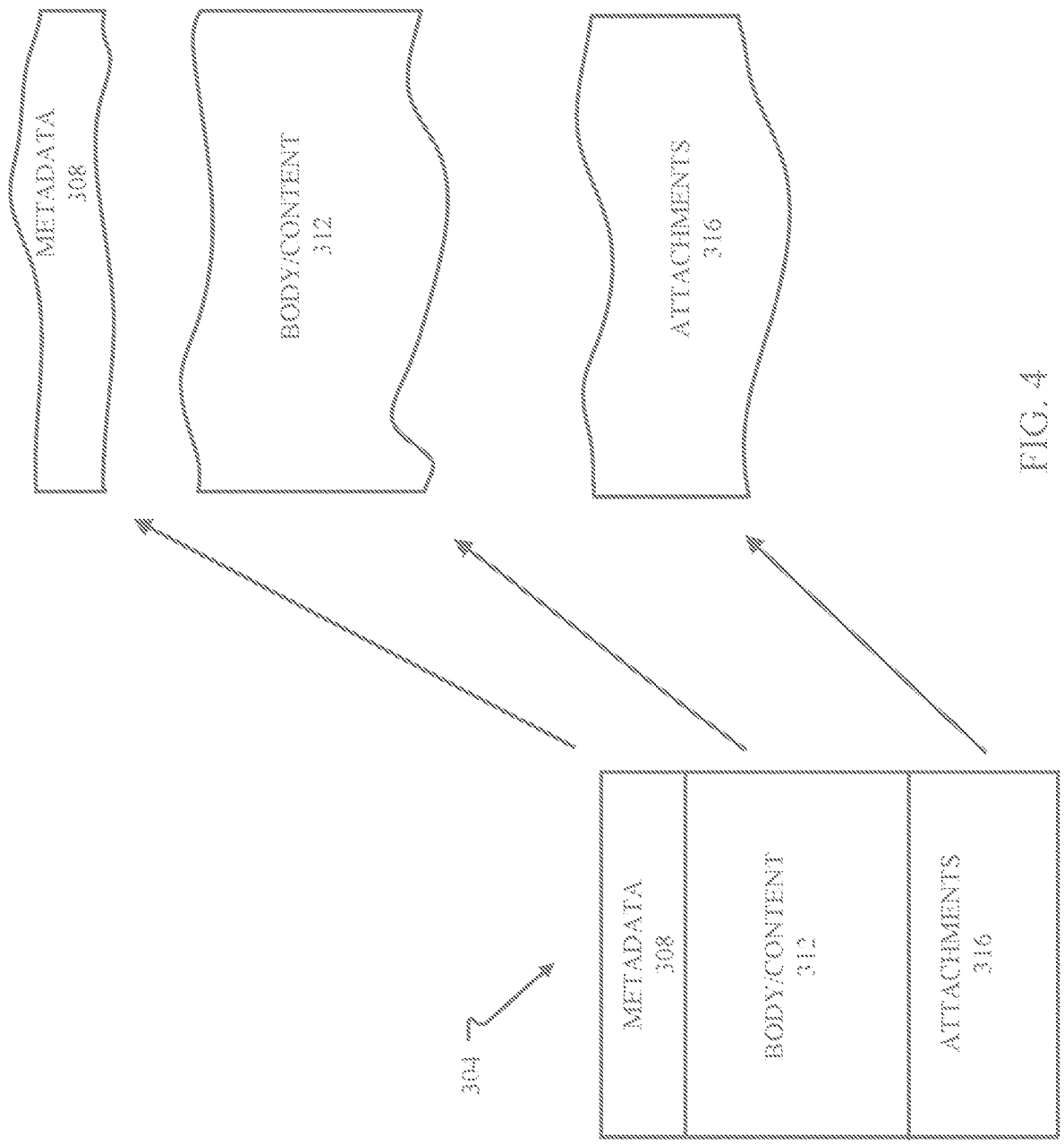
FIG. 4 depicts details of extracted data from one or more emails in accordance with embodiments of the present disclosure.
Figure 5:
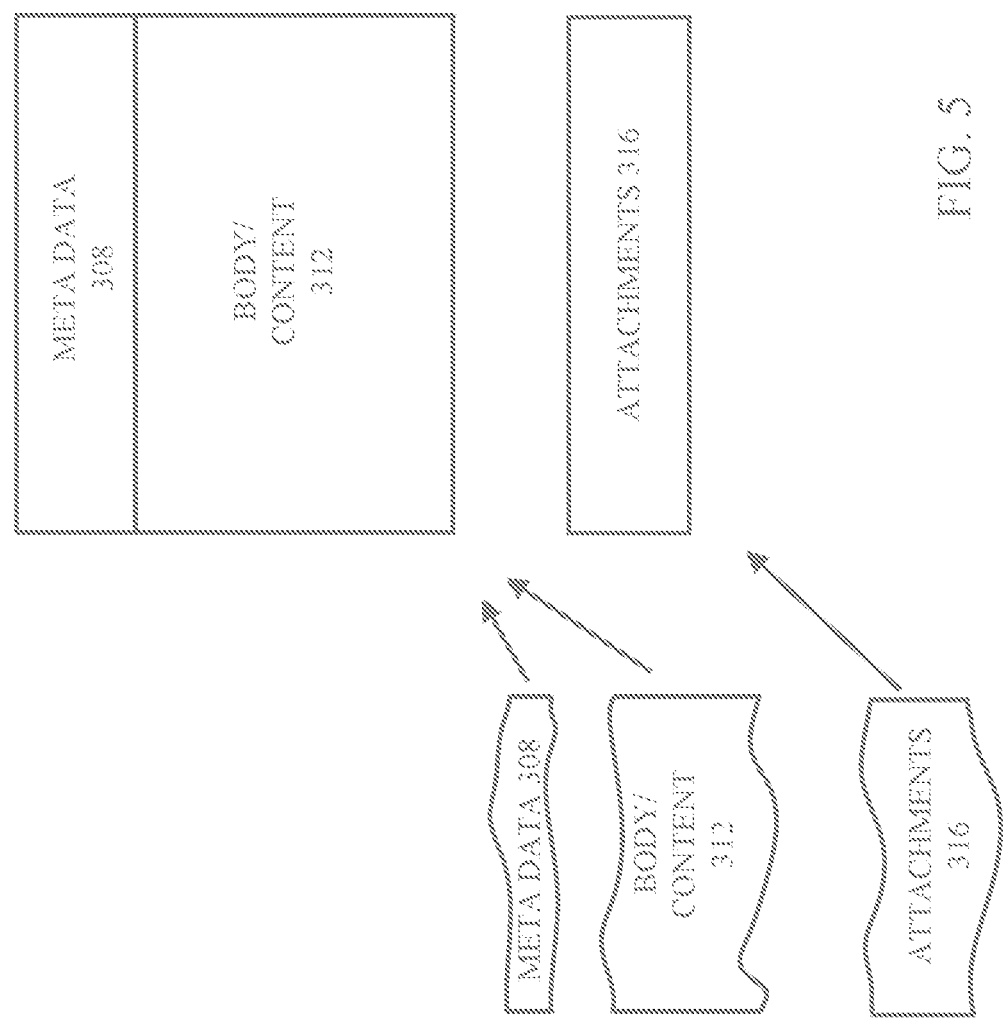
FIG. 5 depicts details of a reconstituted email based on the extracted data of FIG. 4 in accordance with embodiments of the present disclosure.

In accordance with embodiments of the present disclosure, the email 304 may be deconstructed into each of the metadata portion 308, body/content portion 312, and attachments 316, as depicted in FIG. 4. Separately, each of the metadata portion 308, body/content portion 312, and/or attachments 316 may be utilized by the discovery document and privilege log generation system to provide production and privilege documents, together with privilege and/or production logs. That is, the body/content portion 312 may be stripped from the email 304 for example, such that the body/content portion 312 is separated from the email 304. The metadata portion 308 may be parsed to obtain email specific information utilized in a process for automatically tagging the email 304 as a privileged or produced document. In that a produced, or privileged, email document in a delivery ready format may include the body/content portion 312 as well the metadata portion 308 of each of the attachments 316, the metadata portion 308 and body/content portion 312 may be converted back into an email 304 without the attachment portion 316 such that the email 304 stripped of the attachments 316 may be provided in a suitable format, as depicted in FIG. 5.

As depicted in FIG. 6, the metadata portion 308 and the body/content portion 312 may be converted into an email pdf document 604. The email pdf document 604 may be formatted in appearance as, or otherwise be the same as, the email 304 without attachments 316. Similarly, each of the attachments 316 may be converted into an attachment pdf document 608. The email pdf 604 and the attachment pdf document 608 may each be renamed and/or indexed in accordance with a predefined naming convention or indexing system, which, in some embodiments, will not be visible to the user but will be maintained internally. For example, the email pdf 604 may be named (or indexed in the system as) Email_01, while a first attachment pdf document 608 may be named (or indexed in the system as) Email_01_Attachment_01 for example. Accordingly, when produced, the email pdf 604 may be presented immediately prior to the attachment pdf document 608. Moreover, as each email pdf 604 and attachment pdf document 608 are created, an entry into a log file 612 may be made together with metadata extracted and parsed from the metadata portions 308 and metadata portions 208.

As depicted in FIG. 7, and based on the metadata extracted from the metadata portion 308 of each email 304, a list of email addresses from a set of emails may be presented to a user in an email classification console 704. The list of email addresses may be provided based on the To:, Cc:, and/or Bcc: fields of the email 304. The email classification console 704 may display the email addresses 708, a selectable privilege label 712 to be associated with the corresponding email address 708, and the name 716 associated with an email address 708. The privilege label 712 may be based on or otherwise associated with one or more privilege rules as will be discussed. Examples of privilege labels 712 include, but are not limited to roles, such as, "client," "lawyer," "consultant," "adversary," and "third-party." As further depicted in FIG. 7, the privilege labels 712 may be selectable from a prepopulated drop-down menu 720, although in other embodiments selection interfaces such as checkboxes or radio buttons may be used to select the classification.

As depicted in FIG. 8, a privilege weighting algorithm may then classify each of the emails 304 of the email set into a privilege category during a privileged/non-privileged classification process. For example, if any field (e.g., To:, CC:, Bcc) in the email 304 includes an email address having the "adversary" label, the privilege weighting algorithm may presume that the email is non-privileged, associate a "very likely produced" identifier to the email, and mark the email of a first color, such as green. If the email 304 includes an email address having the "attorney" label in the "To:" or "From:" field, and the email 304 includes an email address having the "client" label in the opposite field (e.g., if "attorney" is in the "To:" field and "client" is in the "From:" field), the privilege weighting algorithm may presume that the email is privileged, and the discovery document and privilege log generation system may associate a "very likely privileged" identifier to the email, and mark the email of a second color, such as red. If the email 304 includes an email address having the "client" label in the "To:" or "From:" field, and the email 304 includes an email address having the "attorney" and/or "consultant" label in the "CC:" and/or "BCC:" field(s), the privilege weighting algorithm may presume that the email is likely privileged, and the discovery document and privilege log generation system may associate a "likely privileged" identifier to the email, and mark the email of a third color, such as orange. If the email 304 includes an email address having the "third-party" label in any field, the privilege weighting algorithm may presume that the email is likely not privileged, and the discovery document and privilege log generation system may associate a "likely produced" identifier to the email, and mark the email of a fourth color, such as light green. If the email 304 includes an email address having only the "attorneys" and/or "consultants" label in the "To:" or "From:" field, such that the email is entirely between attorneys and/or consultants, the privilege weighting algorithm may presume that the email is presumed privileged, and the discovery document and privilege log generation system may associate a "very likely privileged" identifier to the email, and mark the email of the second color, such as red. If the email 304 includes an email address having the "client" label in all fields, the privilege weighting algorithm may presume that the email is possibly produced, and the discovery document and privilege log generation system may associate a "possibly produced" identifier to the email, and mark the email of a fifth color, such as yellow. Some embodiments might modify the predictive algorithm to exclude the designation "consultant" and to predict identical treatment of "consultant" and "attorney," and/or may result in using more or fewer than five colors/categories of presumed values as described herein.

The emails may then be presented to a user in a privilege review console 804, where a user may have the option of customizing one or more displayed fields, such as the From: field, Date: field, Privilege Weighted Category field. Moreover, the privilege review console 804 may further indicate whether or not each email includes an attachment at field 828. In addition, each email may be hyperlinked to the email pdf 604 and/or the attachment pdf document 608, allowing a user to view the document and confirm the privileged/non-privileged designation using a checkbox 820 for example. Moreover, the user may edit a privileged/non-privileged designation such that an email may be designated as non-produced in the event of an irrelevant document that is neither produced nor privileged. In some embodiments, a user may be required to confirm, via a checkbox 820 for example, some of the privilege/non-privilege designation prior to completing the document classification process. Alternatively, or in addition, a user may be required to confirm, via a checkbox 820 for example, each of the privilege/non-privilege designation prior to completing the document classification process. In some embodiments, a user may also have the option of designating one or more of the reviewed documents as "confidential," via a checkbox 824 for example, such as where a protective order exists requiring identification of confidential documents.

Figure 9:
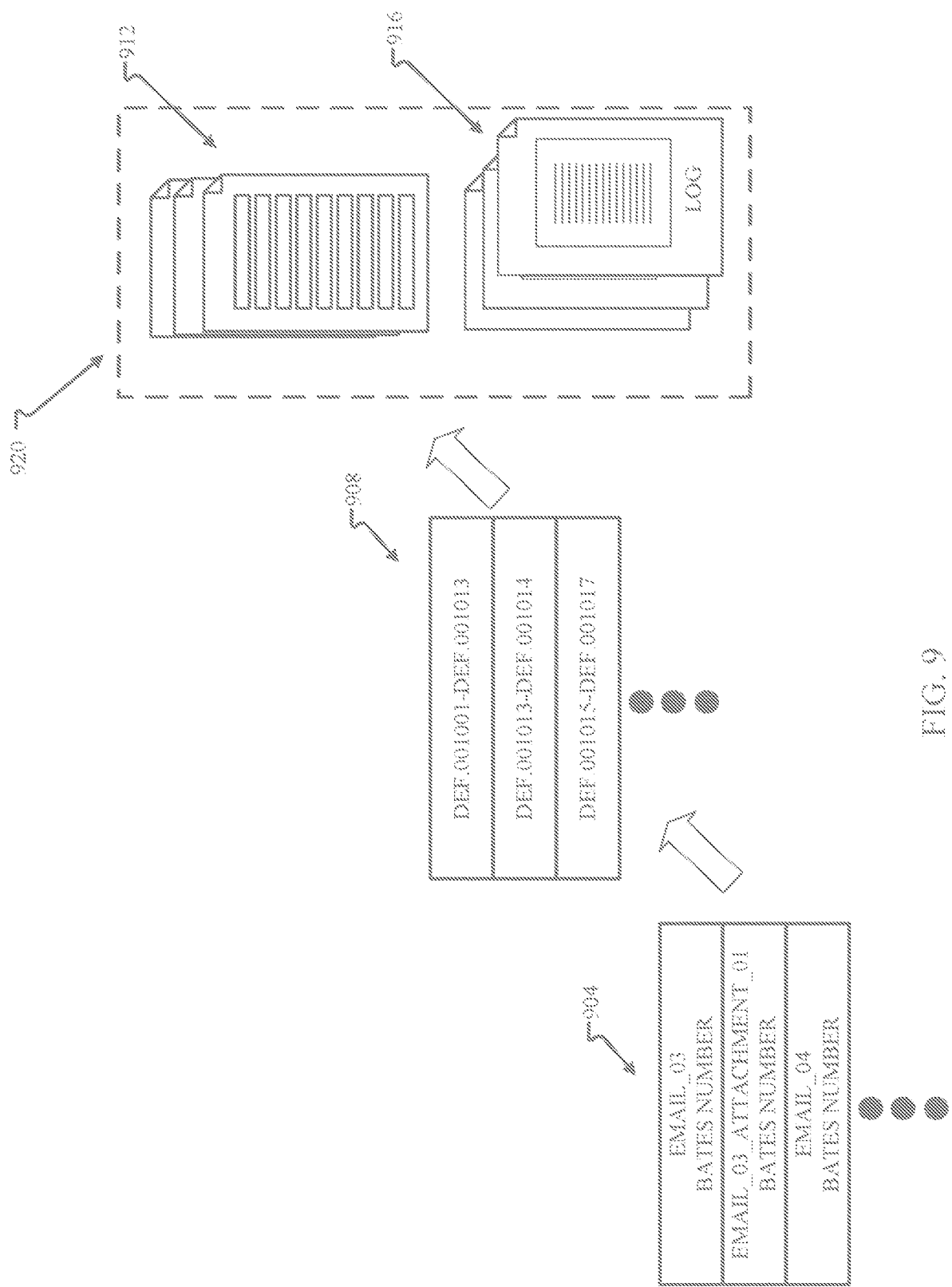
FIG. 9 depicts details directed to applying one or more document sequence identifiers to production and privileged documents and generating one or more production logs in accordance with embodiments of the present disclosure.

FIG. 9 depicts details directed to applying one or more document sequence identifiers to production and privileged documents and generating one or more production logs in accordance with embodiments of the present disclosure. Once the classification process has been completed and has been confirmed by the user, the discovery document and privilege log generation system may sort each of the pdf files 604/608 by privileged/non-privileged categories and then by date. Accordingly, a bates number may be added to each page of each pdf file 604/608 utilizing a designation provided by a user, as illustrated at 904. The pdf file 604/608 may be renamed to correspond to the bates numbering as illustrated at 908. The discovery document and privilege log generation system may then generate log files 916 which may include a privilege log, production log, and/or an irrelevant log, and/or other logs, such as "key" or "redact" logs, whereby the logs may be ordered in accordance with the ordering and bates number of the pdf documents 604/608/912. Each log entry may be categorized and/or comprise an entry in accordance with the user's classification of documents, such as "privileged," "produced," "irrelevant," "key," and/or such other classifications. Additionally or alternative, each log entry may contain data relevant to such email or document, such as the metadata 308/708/808/812 extracted from the email and/or document, which may include the email address(es) contained in the "To:", "From:", "CC:," and "BCC:" fields; the date and/or time on which the email was sent; the subject of the email; the filename of an attachment; the last-modified date of an attachment; and/or other metadata extracted from the emails and/or attachments. In addition, in some embodiments each log would incorporate the user's notes as to each email or attachment (see FIG. 20) input by the user. In accordance with embodiments of the present disclosure, one or more log files, such as the privilege log file, production log file, "key" log file, "redact" log file, etc. may be created or, if already created, appended thereto. In accordance with embodiments of the present disclosure, one or more log files, such as the privilege log file, production log file, and/or an irrelevant log file, may comprise an entry having a hyperlink to one or more pdf documents, such as pdf documents 604/608/912. In some embodiments, duplicates of each log file may be produced, with one version containing entries comprising hyperlinks, or other references, to a pdf document and with the other version containing entries comprising non-hyperlinked entries, such as documents themselves. The log files 916 may be in a .csv file format for delivery to a user. The user may then receive the delivery documents 920 including the pdf documents 912 together with the generated log files 916, each of which may be compressed and/or encrypted prior to delivery.

Figure 10:
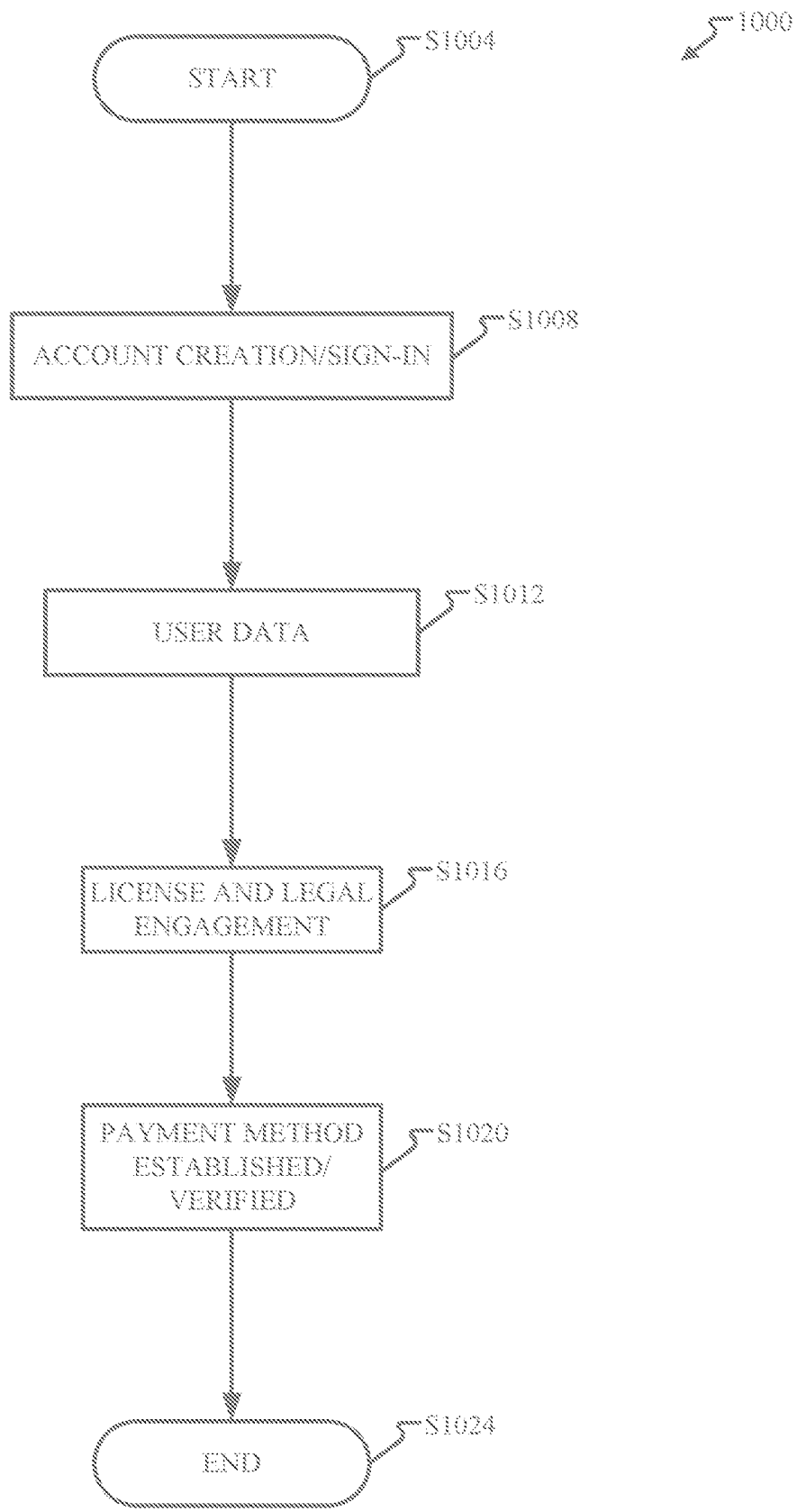
FIG. 10 depicts a first flow diagram directed to user account creation in accordance with embodiments of the present disclosure.

FIG. 10 depicts a method 1000 directed to user account creation for the discovery document and privilege log generation system in accordance with embodiments of the present disclosure. Method 1000 is in embodiments, performed by and/or in conjunction with one or more devices, such as one or more devices included in a discovery document and privilege log generation system. More specifically, one or more hardware and software components may be involved in performing method 1000. In one embodiment, one or more of the previously and/or to-be described units, or devices, perform one or more of the steps of method 1000. The method 1000 may be executed as a set of computer-executable instructions executed by a mobile device, by a computing device, and/or by one or more components of a discovery document and privilege log generation system. One or more portions of method 1000 may be encoded or stored on a computer-readable medium. Hereinafter, the method 1000 shall be explained with reference to systems, components, units, software, etc. described with FIGS. 1-9.

Method 1000 may be initiated at step S1004, where a user may wish to complete a discovery production job. Accordingly, at step S1008, a user may create a new account and/or sign-in into an existing account maintained by the discovery document and privilege log generation system. In instances where the user is creating a new account, the method 1000 may proceed to step S1012 where the user may provide details, such as username, password, and other contact information. Moreover, at step S1016, the user may be required to review and accept a license and legal engagement agreement. At step S1020, the user may establish one or more payment methods and/or accounts, where such information may be verified by the discovery document and privilege log generation system. The method 1000 may then end at step S1024.

Figure 11:
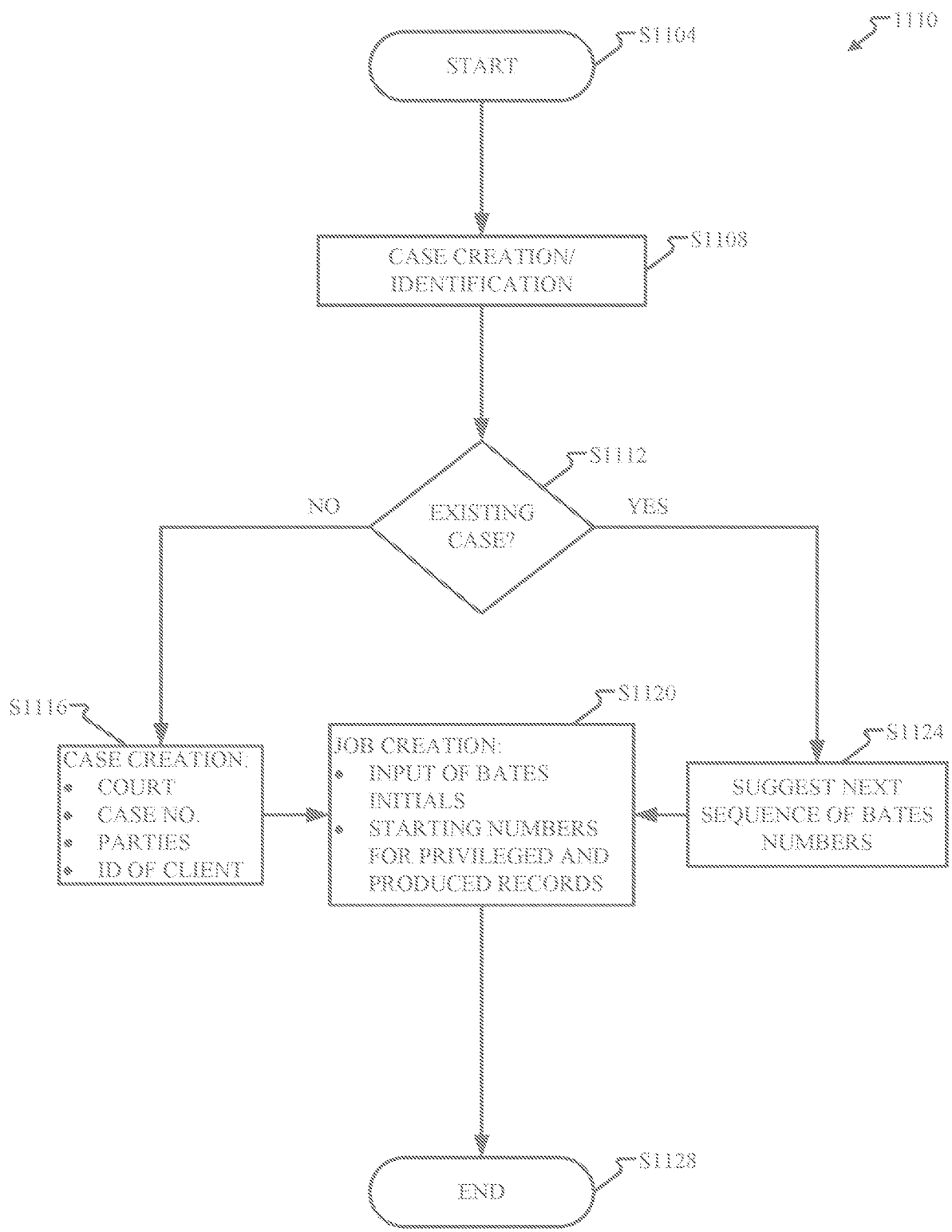
FIG. 11 depicts a second flow diagram directed to case and job creation in accordance with embodiments of the present disclosure.

FIG. 11 depicts a method 1100 directed to case and job creation in accordance with embodiments of the present disclosure. Method 1100 is in embodiments, performed by and/or in conjunction with one or more devices, such as one or more devices included in a discovery document and privilege log generation system. More specifically, one or more hardware and software components may be involved in performing method 1100. In one embodiment, one or more of the previously and/or to be described units, or devices, perform one or more of the steps of method 1100. The method 1100 may be executed as a set of computer-executable instructions executed by a mobile device, by a computing device, and/or by one or more components of a discovery document and privilege log generation system. One or more portions of method 1100 may be encoded or stored on a computer-readable medium. Hereinafter, the method 1100 shall be explained with reference to systems, components, units, software, etc. described with FIGS. 1-10 and 12-20.

Method 1100 may be initiated at step S1104, where a user may wish to initiate a discovery production job and/or task. Accordingly, at step S1108, a user may create and/or identify a particular case. If the case already exists, for example if a user is continuing a document privilege review and/or if a user is performing a new privilege document review with respect to an existing case as shown at step S1112, the method 1100 may proceed to step S1124, where a next set, or sequence, of Bates number is suggested by the discovery document and privilege log generation system based on previously used Bates number. If the case does not exist, information associated with a litigation, such as but not limited to a court, the parties involved, the case number, and a designation of which party is the user's client, may be received from a user at step S1116. Accordingly, at step S1120, the discovery document and privilege log generation system is initialized with Bates numbers and other user-provided information specific to the user and/or the case. The method 1100 may then end at step S1128.

Figure 12:
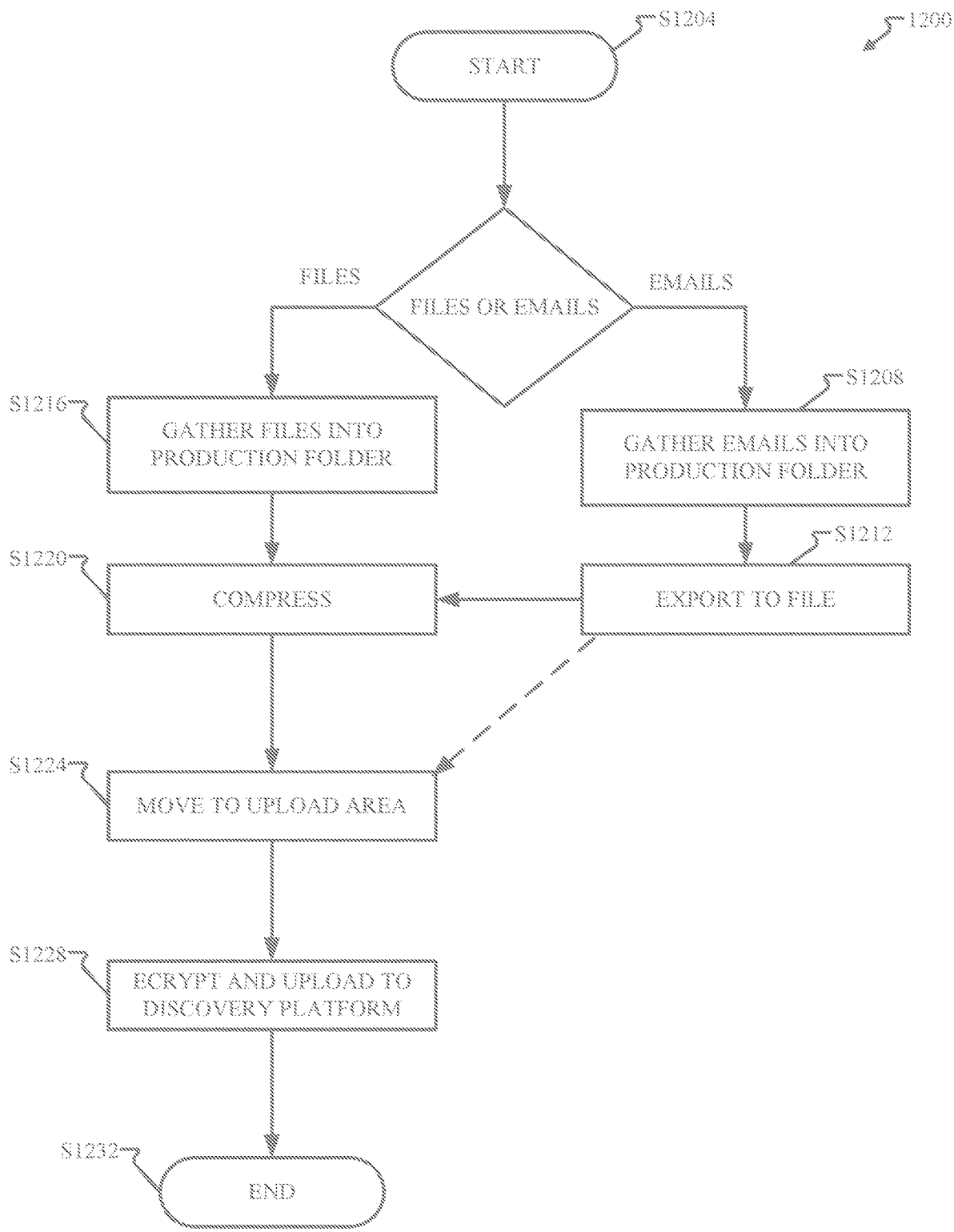
FIG. 12 depicts a third flow diagram directed to obtaining one or more electronic documents for processing in accordance with embodiments of the present disclosure.

FIG. 12 depicts a method 1200 directed to obtaining one or more electronic documents for processing in accordance with embodiments of the present disclosure. Method 1200 is in embodiments, performed by and/or in conjunction with one or more devices, such as one or more devices included in a discovery document and privilege log generation system. More specifically, one or more hardware and software components may be involved in performing method 1200. In one embodiment, one or more of the previously and/or to-be described units, or devices, perform one or more of the steps of method 1200. The method 1200 may be executed as a set of computer-executable instructions executed by a mobile device, by a computing device, and/or by one or more components of a discovery document and privilege log generation system. One or more portions of method 1200 may be encoded or stored on a computer-readable medium. Hereinafter, the method 1200 shall be explained with reference to systems, components, units, software, etc. described with FIGS. 1-11 and 13-20.

Method 1200 may be initiated at step S1204, where a user may wish to initiate a discovery production job and/or task and provide electronic documents to the discovery document and privilege log generation system. Accordingly, at step S1208, the flow of the method 1200 may be directed to gathering and submitting electronic documents other than emails. Accordingly, electronic documents other than emails, such as word files, excel files, and the like, may be grouped into a production folder at step S1216. The production folder including the electronic documents other than emails may be compressed at step S1220. For example, a user may navigate to a folder within a web interface to select one or more files (e.g., .doc, .xls, etc.), which may or may not be compressed. The user may then place the selected electronic documents into a single production folder at step S1216 and drag the folder containing the selected electronic documents into an upload area at step S1224, where the files may be encrypted and transmitted over a communication network to a server of the discovery document and privilege log generation system at step S1228. Method 1200 may end at step S1232.

If a user needs to provide emails to the discovery document and privilege log generation system, the discovery document and privilege log generation system may instruct the user to collect all emails to be processed into a "production" folder or the like at step S1208. In some email systems and console, the "production" folder may need to be exported into a file format that is compatible with the discovery document and privilege log generation system.

For example, the emails may be exported to an .mbox file at step S1212, where the .mbox file may be compressed at step S1220. The compressed .mbox file may then be provided to an upload area at step S1224, where the .mbox file may be encrypted and transmitted over a computing network to a server of the discovery document and privilege log generation system at step S1228. Method 1200 may end at step S1232. In another embodiment, step S1212 may lead directly to step S1224.

Figure 13:
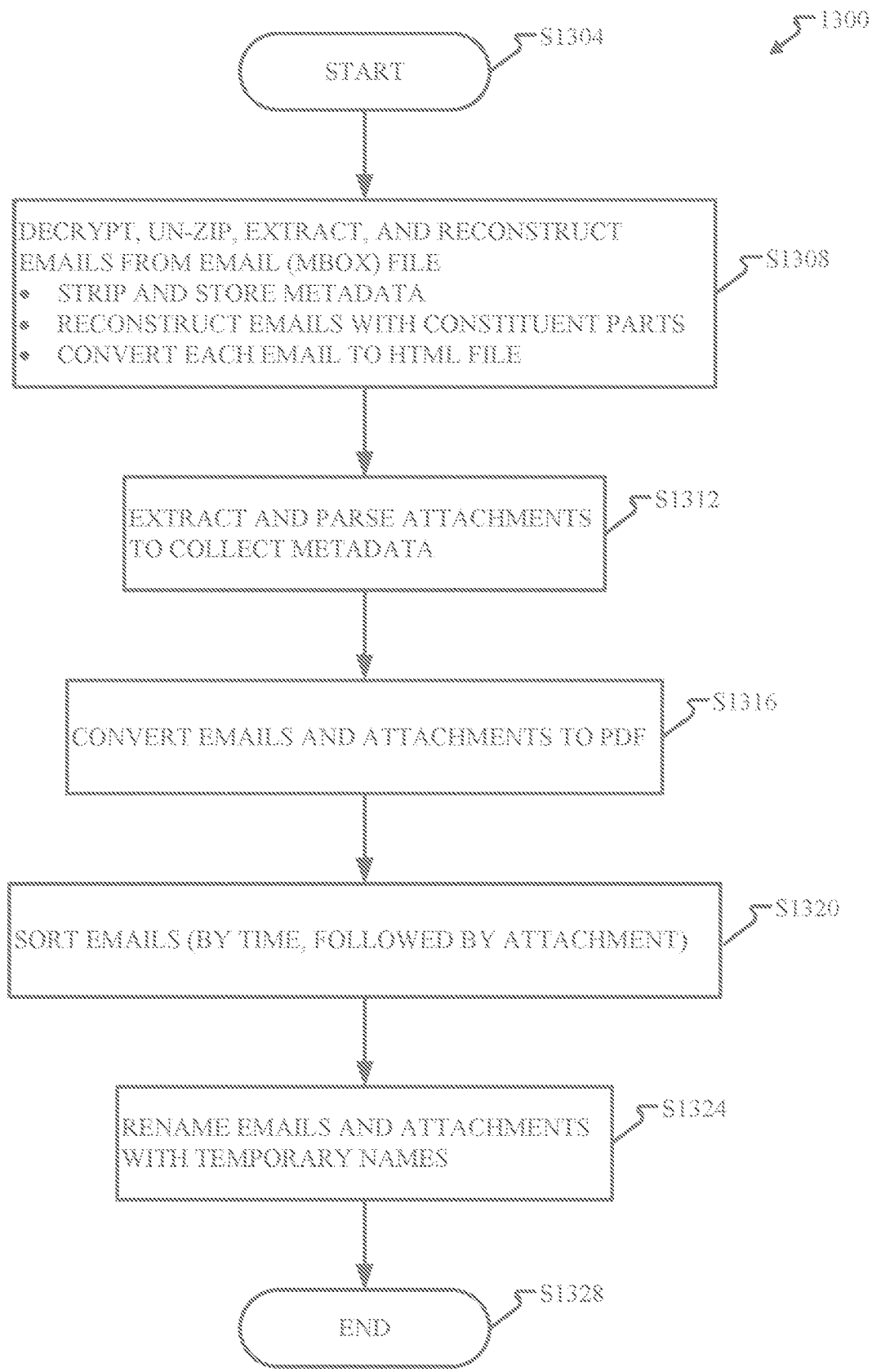
FIG. 13 depicts a fourth flow diagram directed to extracting, parsing, and reconstructing data obtained from one or more email documents in accordance with embodiments of the present disclosure.

FIG. 13 depicts a method 1300 directed to preprocessing email to extract, parse, and reconstruct data obtained from one or more email documents in accordance with embodiments of the present disclosure. Method 1300 is in embodiments, performed by and/or in conjunction with one or more devices, such as one or more devices included in a discovery document and privilege log generation system. More specifically, one or more hardware and software components may be involved in performing method 1300. In one embodiment, one or more of the previously and/or to-be described units, or devices, perform one or more of the steps of method 1300. The method 1300 may be executed as a set of computer-executable instructions executed by one or more components of a discovery document and privilege log generation system. One or more portions of method 1300 may be encoded or stored on a computer-readable medium. Hereinafter, the method 1300 shall be explained with reference to systems, components, units, software, etc. described with FIGS. 1-12 and 14-20.

Method 1300 begins at step S1304 where email may be received for processing. At step S1308, the discovery document and privilege log generation system may decrypt and uncompressed the previously received encrypted and compressed .mbox file. Further, as previously described with respect to FIGS. 2-4, the metadata in the metadata portion 308 of the email 304 may be extracted and stored. For example, data in the To:, Cc:, From:, Date:, and Subject: fields may be retrieved, stored, and associated with the specific email in a privilege/production log; such data may be stored to a table within a database or other file. Each email may then be reconstructed into an HTML format including a header, body, signature and embedded graphics if any. Attachments from the attachments 316 may be identified and labeled accordingly.

At step S1312, metadata associated with the attachments 316 may be parsed and extracted. For example, the metadata portion 208 may be parsed to retrieve information such as, but not limited to the filename, date of creation, author, and the like. At step S1316, the HTML email and attachments, if any, are converted to another user-friendly document format, such as the PDF format. At step S1320, the newly created pdf documents may be sorted, by date for example, whereby an email associated with an attachment precedes the attachment. At step S1324, the emails and attachments in PDF format may be renamed with temporary names. For example, a first email may be named Email_0.pdf and a first attachment associated with the email may be named (or indexed in the database as) Email_0_Attachment_01.pdf. Of course, other naming and/or indexing conventions may be utilized. In some embodiments, a random name may be generated and stored in a table associating the email or document in pdf format with one another and/or implying an ordered relationship. Thus, method 1300 ends at step S1328 with emails sequentially ordered, where attachments associated with emails directly follow the email. For example, the email and attachments may be ordered in the following non-limiting manner: Email_0,_Email_0_Attach1, Email_0_Attach2, Email_1, Email_2, Email_2_Attach_1, etc.

Figure 14:
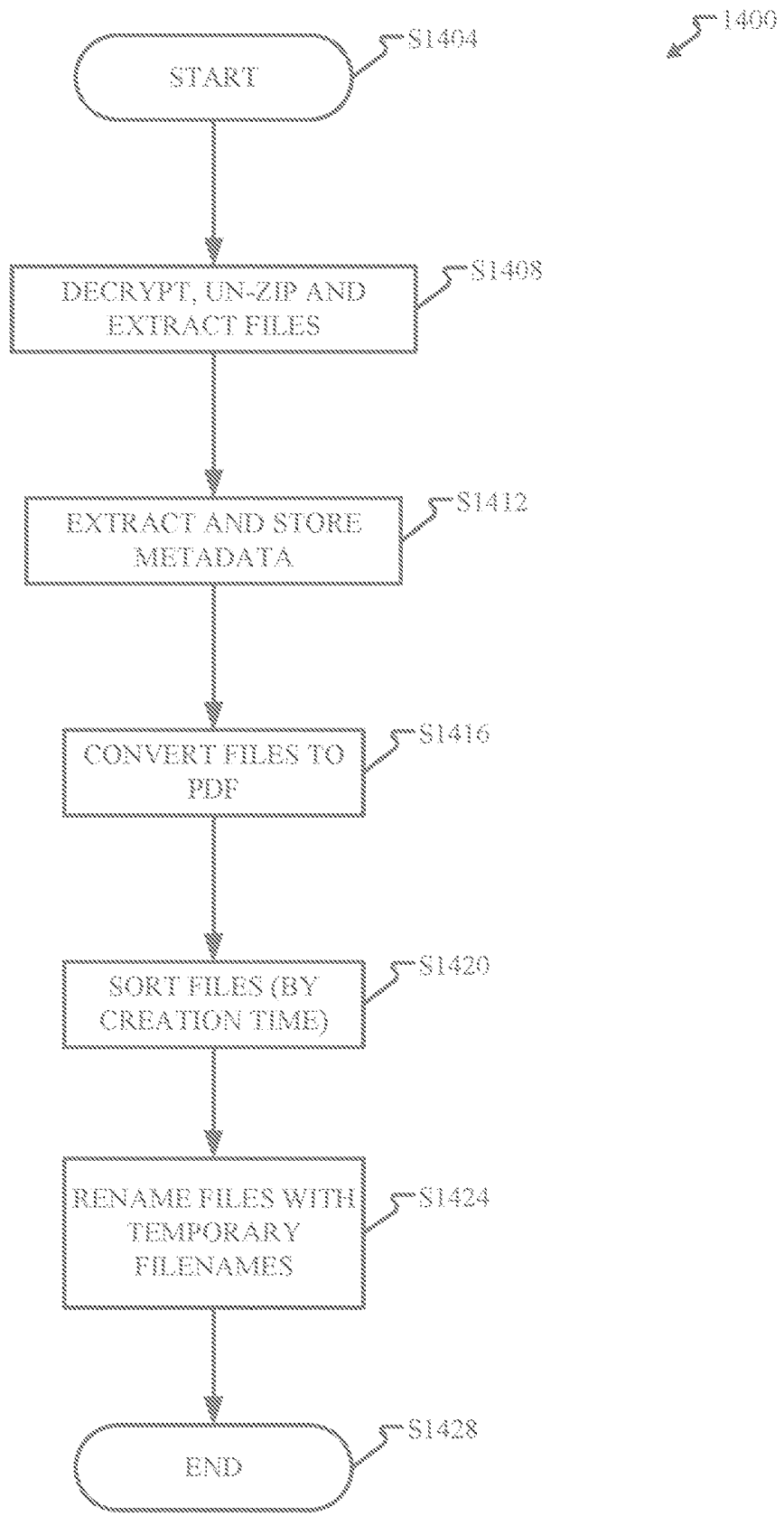
FIG. 14 depicts a fifth flow diagram directed to extracting, parsing, and reconstructing data obtained from one or more electronic documents in accordance with embodiments of the present disclosure.

FIG. 14 depicts a method 1400 directed to extracting, parsing, and reconstructing data obtained from one or more electronic documents in accordance with embodiments of the present disclosure. Method 1400 is in embodiments, performed by and/or in conjunction with one or more devices, such as one or more devices included in a discovery document and privilege log generation system. More specifically, one or more hardware and software components may be involved in performing method 1400. In one embodiment, one or more of the previously and/or to be described units, or devices, perform one or more of the steps of method 1400. The method 1400 may be executed as a set of computer-executable instructions executed by one or more components of a discovery document and privilege log generation system. One or more portions of method 1400 may be encoded or stored on a computer-readable medium. Hereinafter, the method 1400 shall be explained with reference to systems, components, units, software, etc. described with FIGS. 1-13 and 15-20.

Method 1400 begins at step S1404 where electronic documents may be received for processing. At step S1408, the discovery document and privilege log generation system may decrypt and decompress the previously received encrypted and compressed electronic documents, such as files in a Word, Pdf, Excel, or PowerPoint format for example. At step S1412, metadata from the metadata portion 208 may be extracted, parsed, and stored in a table within a database or other file. At step S1416, each of the electronic documents may be converted to another format, such as PDF. At step S1420, the newly created PDF files may be sorted according to creation time for example, and then renamed with a temporary filename, and/or with an internal index identification, at step S1424. Non-limiting examples of the filenames and/or internal index identification, may include "File_1," "File_2," etc. Method 1400 may end at step S1428, whereby an ordered list of files is produced.

Figure 15:
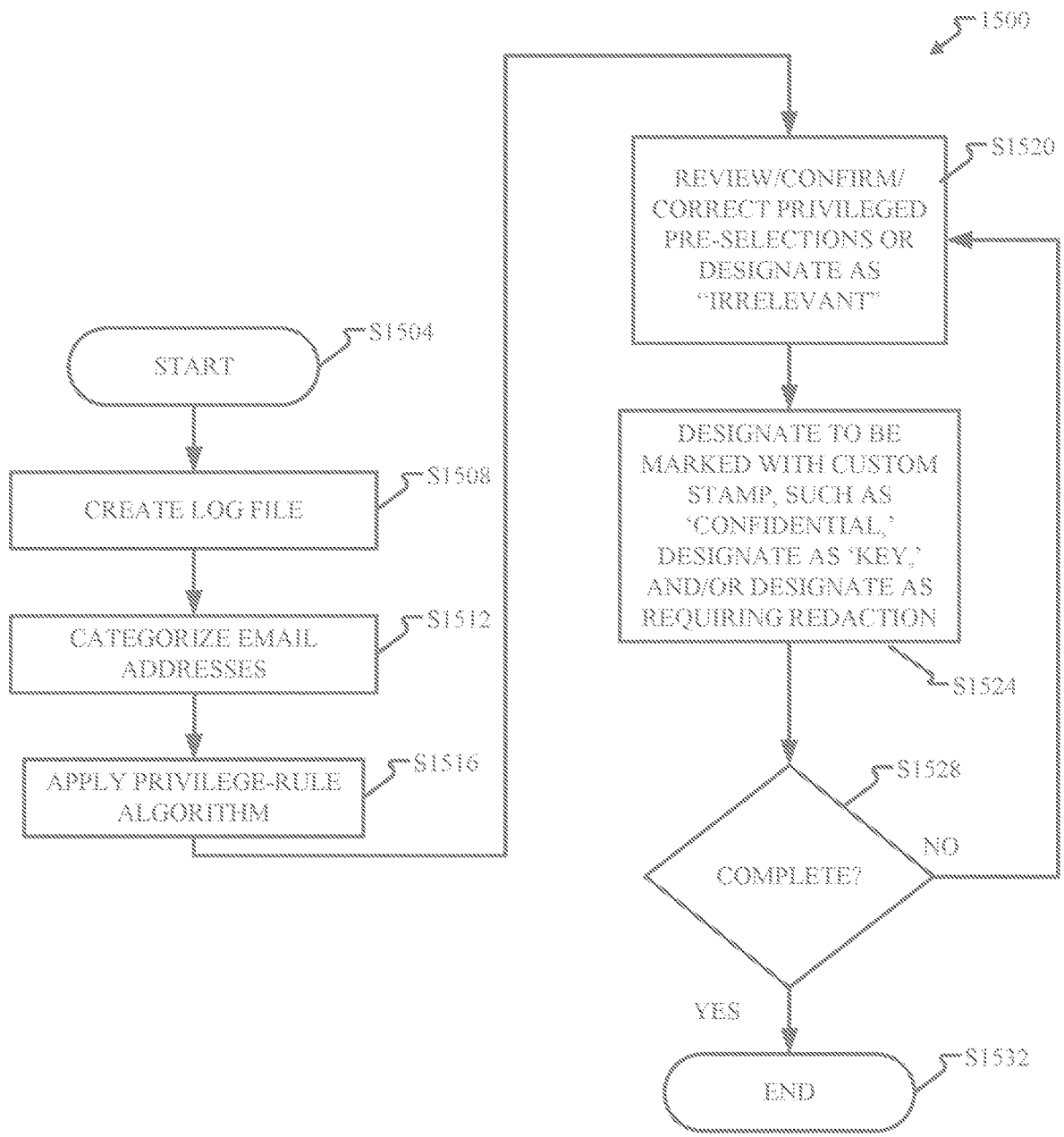
FIG. 15 depicts a sixth flow diagram directed to applying a privilege rule algorithm based on extracted and parsed data obtained from one or more emails in accordance with embodiments of the present disclosure.

FIG. 15 depicts a method 1500 directed to applying a privilege rule algorithm based on extracted and parsed data obtain from one or more emails in accordance with embodiments of the present disclosure. Method 1500 is in embodiments, performed by and/or in conjunction with one or more devices, such as one or more devices included in a discovery document and privilege log generation system. More specifically, one or more hardware and software components may be involved in performing method 1500. In one embodiment, one or more of the previously and/or to-be described units, or devices, perform one or more of the steps of method 1500. The method 1500 may be executed as a set of computer-executable instructions executed by one or more components of a discovery document and privilege log generation system. One or more portions of method 1500 may be encoded or stored on a computer-readable medium. Hereinafter, the method 1500 shall be explained with reference to systems, components, units, software, etc. described with FIGS. 1-14 and 16-20.

Method 1500 is initiated at step S1504 and one or more tables or log files 612, such as a .csv table, is created at step S1508. Each row in the table, or log file 612, may include hyperlinks to an associated email pdf 604 and/or attachment pdf document 608 and may further include metadata from the metadata portion 308 and/or metadata portion 208. As previously described, at step S1512, email addresses associated with the metadata portion 308 of each email may be retrieved and presented to a user for classification as previously described with respect to FIG. 7. Accordingly, the discovery document and privilege log generation system may then apply a privilege rule algorithm to pre-populate probable privileged/non-privileged status at step S1516 and as previously described with respect to FIG. 8. That is, a privilege weighting algorithm may classify each of the emails into a privilege category during the privileged/non-privileged classification process of step S1512. For example, if any field (e.g., To:, CC:, Bcc) in the email 304 includes an email address having the "adversary" label, the privilege weighting algorithm may presume that the email is non-privileged, associate a "presumed produce" identifier to the email, and mark the email of a first color, such as green. If the email 304 includes an email address having the "attorney" label in the "To:" or "From:" field, and the email 304 includes an email address having the "client" label in the opposite field (e.g., if "attorney" is in the "To:" field and "client" is in the "From:" field), the privilege weighting algorithm may presume that the email is privileged, and the discovery document and privilege log generation system may associate a "presumed privileged" identifier to the email, and mark the email of a second color, such as red. If the email includes an email address having the "consultant" label in the "To:" or "From:" field, and the email includes an email address having the "client" label in the opposite field (e.g., if "consultant" is in the "To:" field and "client" is in the "From:" field), the privilege weighting algorithm may presume that the email is likely to be privileged, and the discovery document and privilege log generation system may associate a "presumed likely privileged" identifier to the email, and mark the email of a third color, such as orange. "Consultant" may, or may not, be considered as having the same rights and privileges as "attorney." If the email 304 includes an email address having the "third-party" label in any field, the privilege weighting algorithm may presume that the email is likely not privileged, and the discovery document and privilege log generation system may associate a "likely produced" identifier to the email, and mark the email of a fourth color, such as light green. If the email 304 includes an email address having only the "attorneys" and/or "consultants" label in the "To:" or "From:" field, such that the email is entirely between attorneys and/or consultants, the privilege weighting algorithm may presume that the email is presumed privileged, and the discovery document and privilege log generation system may associate a "very likely privileged" identifier to the email, and mark the email of the second color, such as red. If the email 304 includes an email address having the "client" label in all fields, the privilege weighting algorithm may presume that the email is possibly produced, and the discovery document and privilege log generation system may associate a "possibly produced" identifier to the email, and mark the email of a fifth color, such as yellow. Some embodiments might modify the predictive algorithm to exclude the designation "consultant" and to predict identical treatment of "consultant" and "attorney," and/or may use more or fewer than five colors/categories of presumed values as described herein. Accordingly, a color-coded output including emails sorted by color may be presented to a user for review as depicted in FIG. 8. At step S1520, the user may review, confirm, and/or correct the privileged pre-selections. Should a document be determined by the user to be irrelevant, the document may be so designated. At step S1524, the user may designate a reviewed document as "Confidential," and/or "key" and/or "redacted"; in addition, the user may input notes associated with a particular document. Once completed at step S1528, method 1500 ends at step S1532.

Figure 16:
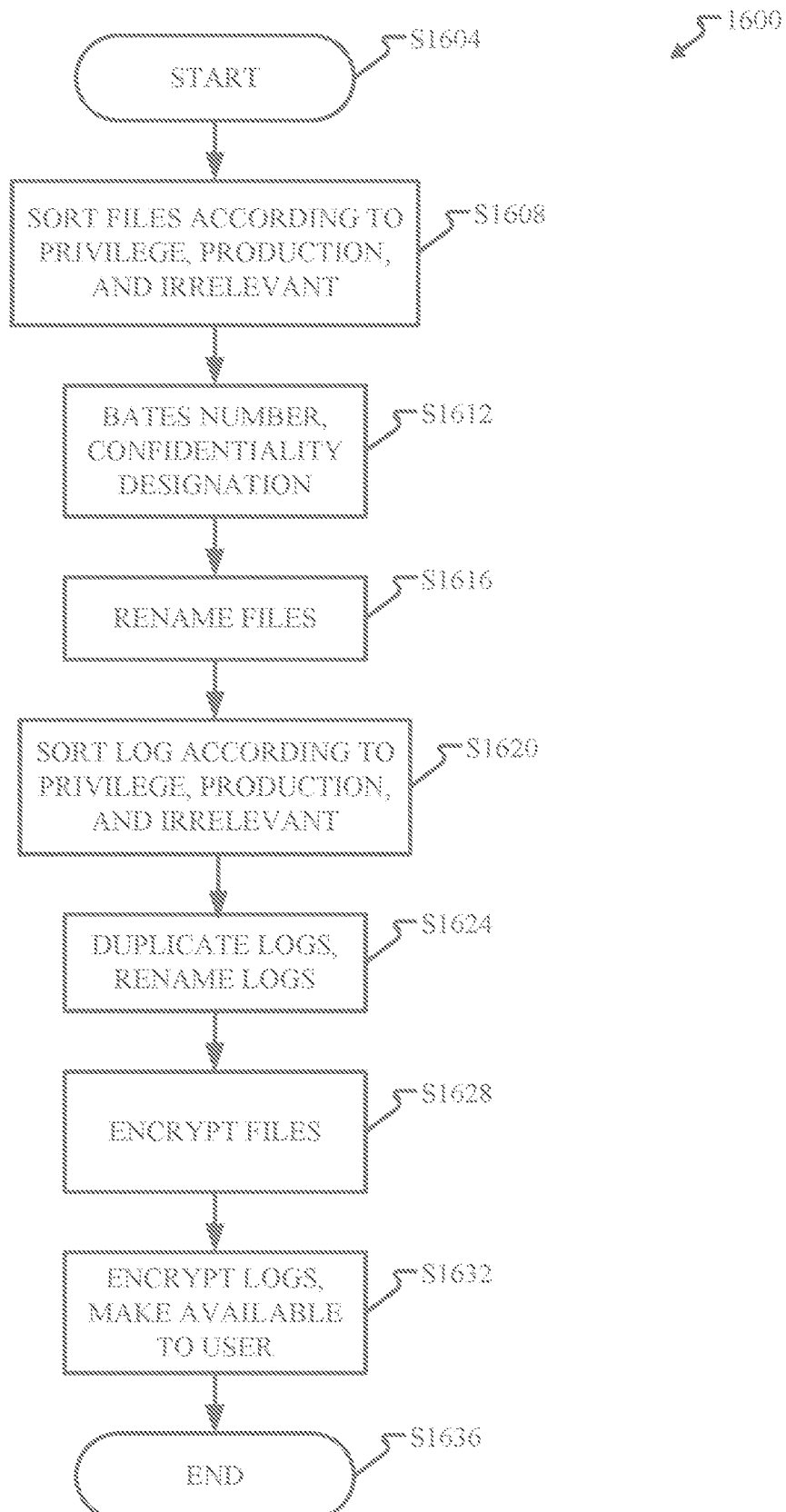
FIG. 16 depicts a seventh flow diagram directed to applying one or more document sequence identifiers to production and privileged documents and generating one or more production logs in accordance with embodiments of the present disclosure.

FIG. 16 depicts a method 1600 directed to applying one or more document sequence identifiers to production and privileged documents and generating one or more production logs in accordance with embodiments of the present disclosure. Method 1600 is in embodiments, performed by and/or in conjunction with one or more devices, such as one or more devices included in a discovery document and privilege log generation system. More specifically, one or more hardware and software components may be involved in performing method 1600. In one embodiment, one or more of the previously and/or to be described units, or devices, perform one or more of the steps of method 1600. The method 1600 may be executed as a set of computer-executable instructions executed by one or more components of a discovery document and privilege log generation system. One or more portions of method 1600 may be encoded or stored on a computer-readable medium. Hereinafter, the method 1600 shall be explained with reference to systems, components, units, software, etc. described with FIGS. 1-15 and 17-20.

Method 1600 is initiated at step S1604, and at step S1608, files are sorted into groups of privileged documents, produced documents, and irrelevant documents based on the classification and review performed in method 1500. At step S1612, the discovery document and privilege log generation system may add Bates numbers to each page of each PDF file starting with the designation and page number provided by the user at step S1120 and/or suggested by the discovery document and privilege log generation system in step S1124. Likewise, at step S1612, the discovery document and privilege log generation system may add a "Confidentiality" or other custom legend to each page of each document designated by the user to receive a "Stamp". Accordingly, the discovery document and privilege log generation system may rename each of the files in step S1616 renames files to match the Bates numbers. For example, an electronic document may be named "Def.001001-Def.001013" followed by "Def.001014". Importantly, the discovery document and privilege log generation system maintains the order of emails followed by attachments. That is, a sequence of documents may include a pdf of the email followed by a pdf of attachments, if any, followed by another email. In some embodiments, if the user has designated a document as a "Key" document, an extra copy of the "Key" document is placed in a "Key" folder to be returned to the user. In another embodiment, "key" and/or "redact" logs may be produced.

At step S1620, the references to the electronic documents in the one or more tables, such as a .csv table, may be sorted according to privilege, production, and irrelevant log. The sorted log file, for example log file 612, may be split into a production log file, a privileged log file, and an irrelevant log file. The production log file includes all documents categorized as production or that can be produced. The privileged log file includes all documents categorized as privileged, and the irrelevant log file includes all documents reviewed that are not relevant to the litigation, and will neither be produced nor withheld under a claim of privilege. In some embodiments, additional logs may be produced, such as a log of every document designated as "key." Each log, which would correspond to the user's classification of documents as "privileged," "produced," "irrelevant," "key," and/or such other classifications as the particular embodiment encompasses, may contain data relevant to such email or document, such as the metadata 308/708/808/812 extracted from the email and/or document, which may include the email address(es) contained in the "To:", "From:", "CC:," and "BCC:" fields; the date and/or time on which the email was sent; the subject of the email; the filename of an attachment; the last-modified date of an attachment; and/or other metadata extracted from the emails and/or attachments. In addition, each log may incorporate the user's notes as to each email or attachment (see FIG. 20) input by the user. For documents designated as "redact" by the user (see FIG. 20), a "redact" notation may be added to the record for such document in the production log to remind the user to redact the final pdf before production. Each of the log files may then be sorted to match an order of the pdf documents, 912 for example. In some embodiments, the filenames in the log files are renamed to match the file names of step S1616. At step S1624, each of the log files may then be duplicated, where a first set is for internal use and the second set is for production. Thus, the set of log files for internal use may include hyperlinks to the corresponding pdf files for use by the user or law firm. The second set of log files (i.e., the set of log files to be provided in response to a request for production) may not include hyperlinks to the corresponding pdf files. At step S1628, the files 912 and logs 916 may be encrypted and may be made available to the user at step S1632, such that the user may be able to download the delivery documents 920 from the discovery document and privilege log generation system. Method 1600 may end at step S1636.

Figure 17:
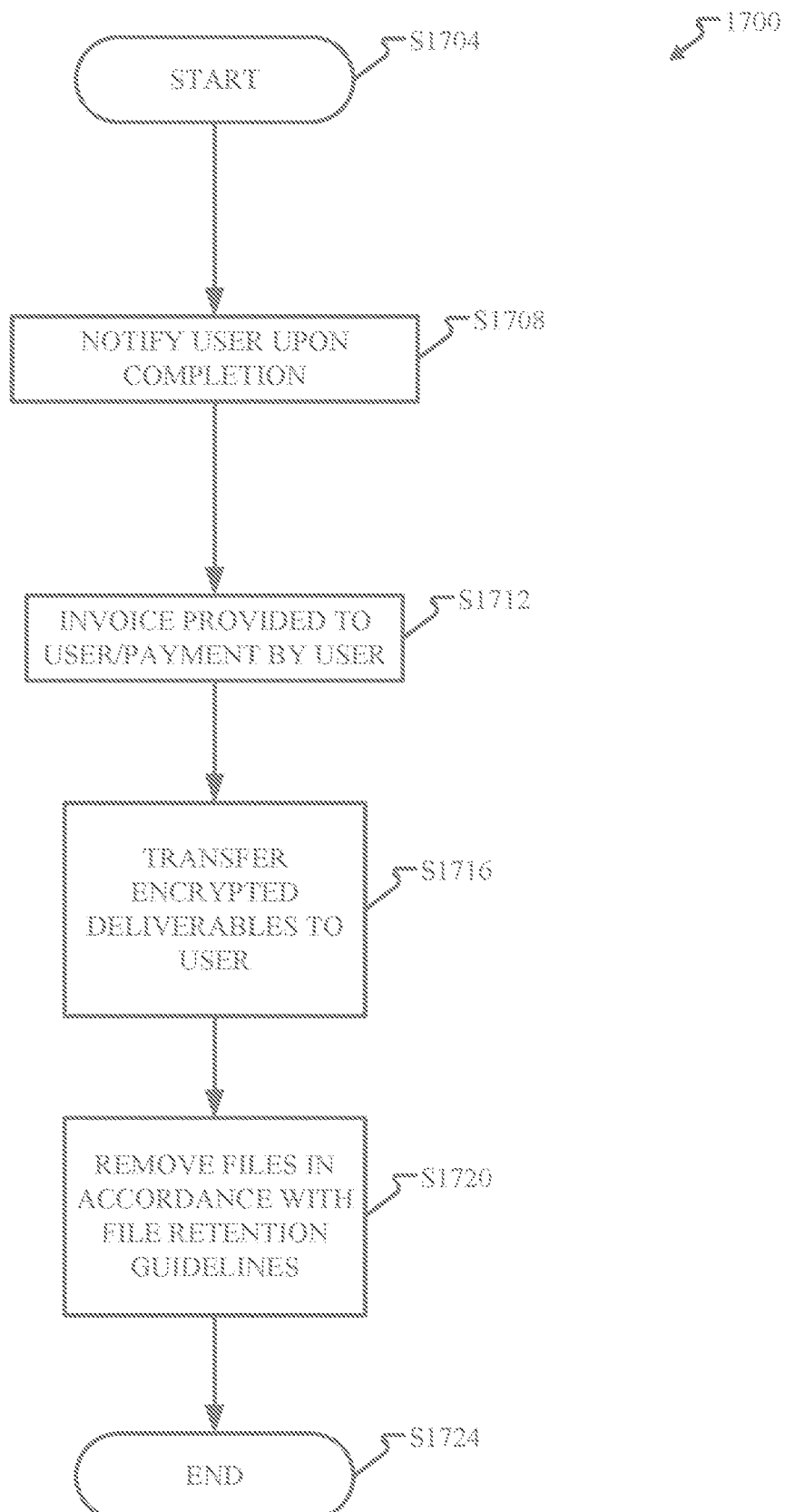
FIG. 17 depicts an eighth flow diagram directed transferring deliverables in accordance with embodiments of the present disclosure.

FIG. 17 depicts a method 1700 directed to transferring deliverables in accordance with embodiments of the present disclosure. Method 1700 is in embodiments, performed by and/or in conjunction with one or more devices, such as a mobile device, computing device, and/or one or more devices included in a discovery document and privilege log generation system. More specifically, one or more hardware and software components may be involved in performing method 1700. In one embodiment, one or more of the previously and/or to be described units, or devices, perform one or more of the steps of method 1700. The method 1700 may be executed as a set of computer-executable instructions executed by one or more components of a discovery document and privilege log generation system. One or more portions of method 1700 may be encoded or stored on a computer-readable medium. Hereinafter, the method 1700 shall be explained with reference to systems, components, units, software, etc. described with FIGS. 1-16 and 18-20.

Method 1700 is initiated at step S1704, where at step S1708, a user may receive a notification that the delivery documents 920 are ready and available. For example, a device associated with a user, such as a mobile device, may receive a notification, such as an email or text message, that the delivery documents 920 are available. At step S1712, an invoice may be provided to the user. Once the discovery document and privilege log generation system has received acceptance of charges and/or payment from the user, the encrypted deliverables 920 may be transferred to the user, via email, a download, or otherwise at step S1716. In accordance with a preplanned and established file retention policy, the deliverable documents 920 may be removed from the discovery document and privilege log generation system at step S1720. Method 1700 may then end at step S1724.

Figure 18:
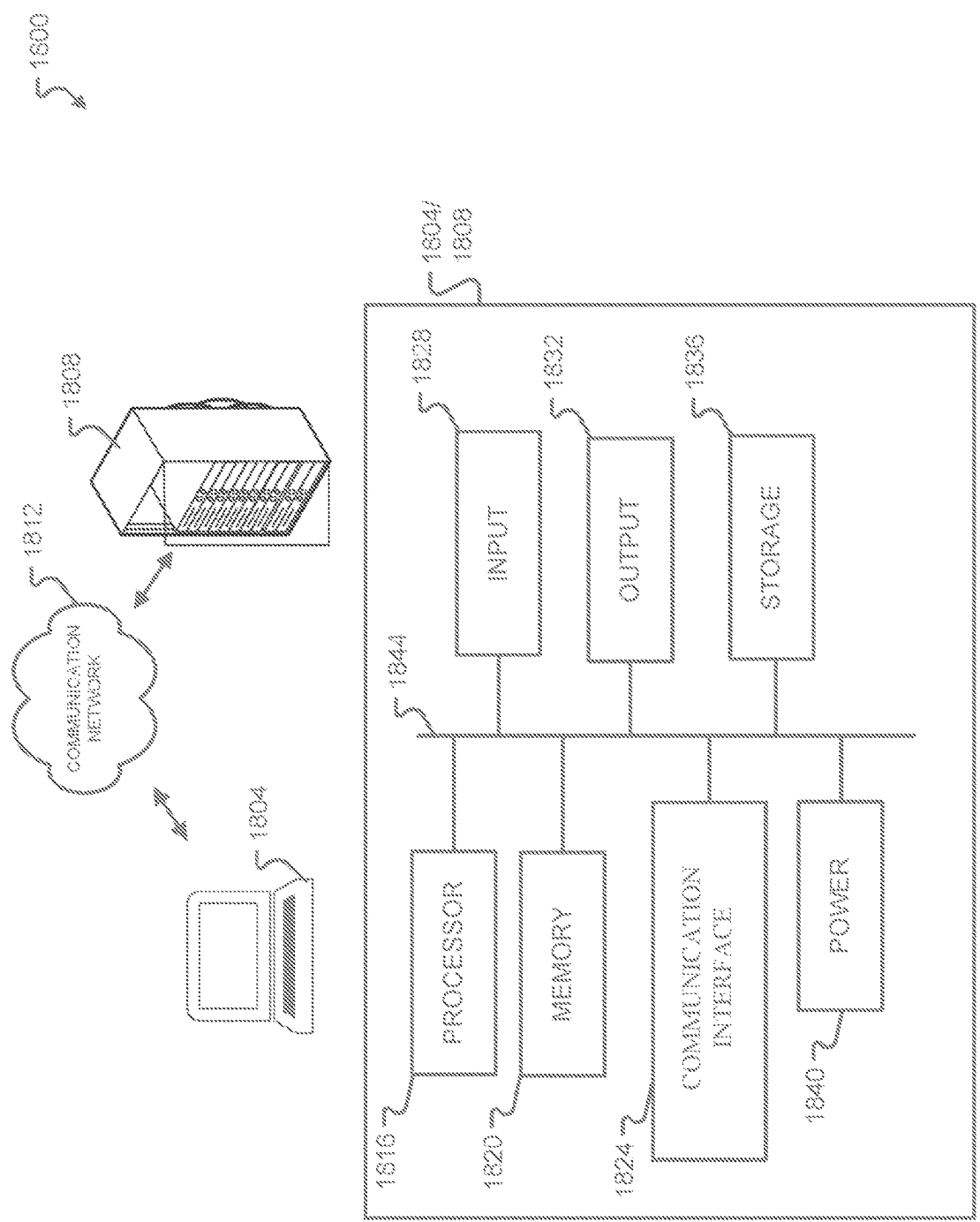
FIG. 18 depicts details of a block diagram directed to a discovery document and privilege log generation system in accordance with embodiments of the present disclosure.

FIG. 18 depicts details of a block diagram directed to a discovery document and privilege log generation system 1800 in accordance with embodiments of the present disclosure. As depicted in FIG. 18, a computing device, such as 1804, may communicate with one or more servers 1808 of the discovery document and privilege log generation system 1800 via a communication network 1812. The communication network 1812 may comprise any type of known communication medium or collection of communication media and may use any type of known protocols to transport messages between endpoints. The communication network 1812 is generally a wireless communication network employing one or more wireless communication technologies; however, the communication network 1812 may include one or more wired components and may implement one or more wired communication technologies. The Internet is an example of the communication network 1812 that constitutes an Internet Protocol (IP) network consisting of many computers, computing networks, and other communication devices located all over the world, which are connected through many networked systems and other means.

The computing device 1804 and the one or more servers 1808 may include a processor 1816, memory 1820, a communication interface 1824, receive one or more inputs 1828, provide one or more outputs 1832, and may include storage 1836. In certain embodiments, a processor may be a virtual processor which provides the appearance to the user and/or software to be a dedicated processing device(s). In such embodiments, the virtual processor executes instructions, often utilizing one instruction set, to cause the underlying physical processors, which may be dedicated or shared by other software and/or users, to perform the operations described herein, which may be the same or a different instruction set in accordance with the processors circuitry and immutable instructions (e.g., firmware).

The computing device 1804 and/or the server 1808 may also be provided with power 1840, where the processor 1816, memory 1820, communication interface 1824, inputs 1828, outputs 1832, storage 1836, and power 1840 may be coupled to one another via one or more buses 1844. The processor 1816 may be implemented as any suitable type of microprocessor or similar type of processing chip, such as any general-purpose programmable processor, digital signal processor (DSP) or controller for executing application programming contained within memory 1820. Alternatively, or in addition, the processor 1816 and memory 1820 may be replaced or augmented with an application specific integrated circuit (ASIC), a programmable logic device (PLD), or a field programmable gate array (FPGA).

The memory 1820 generally comprises software routines facilitating, in operation, pre-determined functionality of the computing device 1804 or server 1808. The memory 1820 may be implemented using various types of electronic memory generally including at least one array of non-volatile memory cells (e.g., Erasable Programmable Read Only Memory (EPROM) cells or flash memory cells, etc.). The memory 1820 may also include at least one array of Dynamic Random Access Memory (DRAM) cells. The content of the DRAM cells may be pre-programmed and write-protected thereafter, whereas other portions of the memory may be selectively modified or erased. The memory 1820 may be used for either permanent data storage or temporary data storage.

Alternatively, or in addition, storage 1836 may be provided. The storage 1836 may generally include storage electronic documents and/or log files. The storage 1836 associated with the computing device 1804 or server 1808 may also provide storage for operating system software, programs, and program data.

FIG. 19 depicts details console 1900 relating to classifying email addresses for use with an automated privilege rule algorithm in accordance with embodiments of the present disclosure. Emails 1904 displayed in details console 1900 may be based on the metadata extracted from the metadata portion 308 of each email 304, a list of email addresses 1904 may then be presented to a user on detail console 1900. In one embodiment, a data structure is illustrated as comprising, number of emails 1902, email address 1904, and indicators, such as a checkbox for one or more attributes, which may include one or more of client 1906, attorney 1908, adverse party 1910, and/or third-party 1920.

Figure 20B:
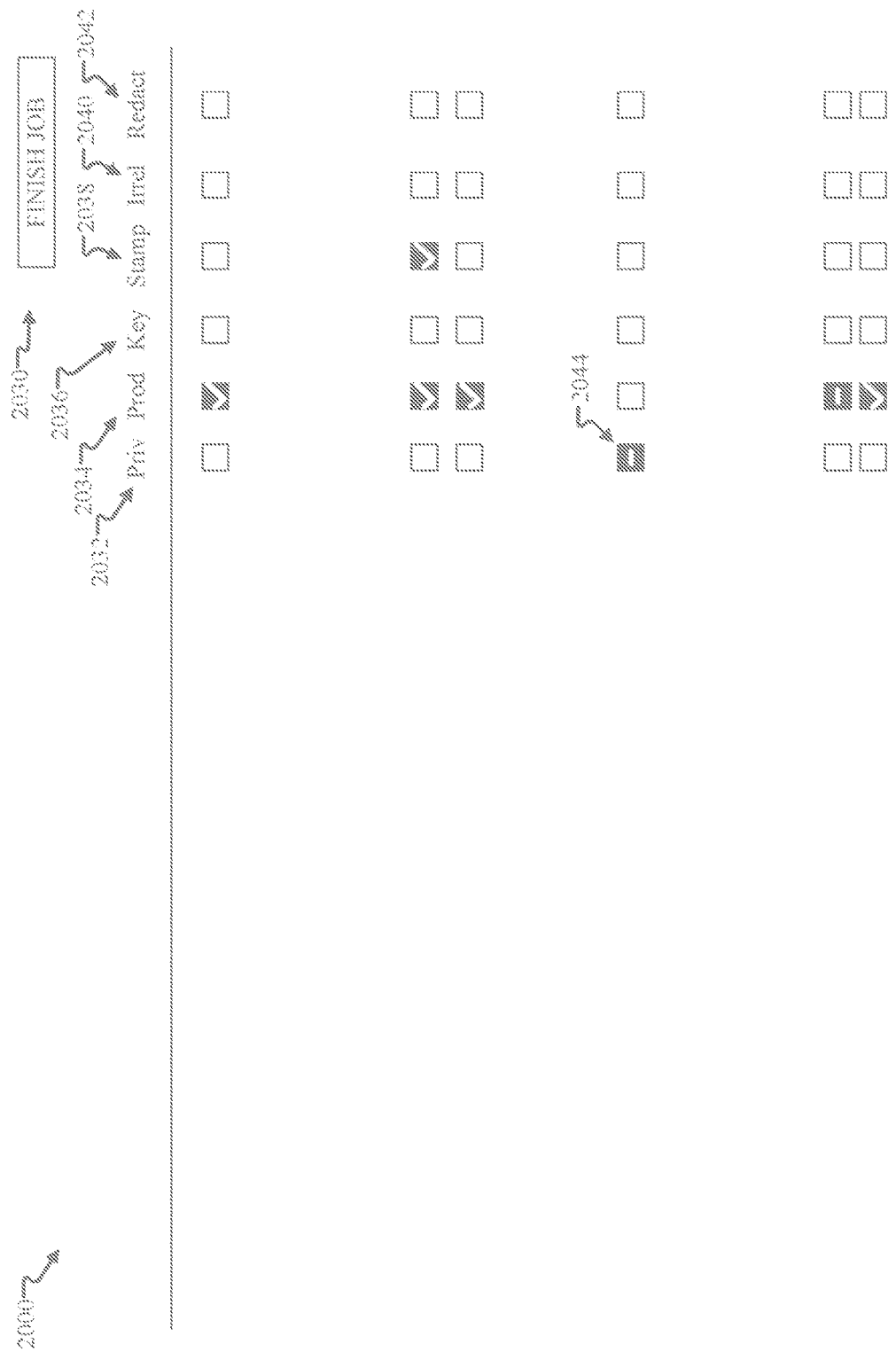

FIGS. 20A-20B depict details console 2000 relating to applying a privilege weighted category to one or more emails in accordance with embodiments of the present disclosure. Details console 2000 is illustrated herein in segments comprising a left portion, illustrated by FIG. 20A, and a right portion, illustrated by FIG. 20B. In one embodiment, and as described in more detail with respect to the preceding embodiments, a privilege weighting algorithm may classify each of the emails 304 of the email set into a privilege category during a privileged/non-privileged classification process. The emails to be displayed may be determined or ordered, in whole or in part, by ordering 2002, filtering by production category 2004, filter by selected category 2006, specific email attributes 2008. Displayed content may include subject/file name 2010, date the email was sent (or last modified) 2012, from 2014, to 2016, carbon/curtesy copy/blind CC ("CC/BCC") 2018, and/or notes 2020. Emails may have attachments identified in attachment portion 2022/2024.

Emails may then be presented to a user in a details console 2000, where a user may have the option of customizing one or more displayed fields. In particular notes, 2020/2026 may be added. Moreover, details console 2000 may further indicate whether or not each email includes an attachment at attachment portion 2022/2024. A user may edit designations provided by classification algorithm, the designations may be altered by selecting/unselecting privileged indicator 2032, production indicator 2034, key indicator 2036 such as documents to be returned, (Bates) stamp indicator 2038, irrelevant indicator 2040, and/or redaction indicator 2042. When a user has competed any reclassifications, an indication of the completeness may be selected, such as by selecting "finished" indicator 2030. Indicia 2044 provides a visual representation of a processor determined value that has been confirmed, such as by a user. For example, an email from one party, known to be associated with "privilege" may be sent to another party and a subsequent email from that party may be defaulted similarly, such as to "privileged." A user may be prompted to confirm the status and, once the status is confirmed, indicia 2044 may indicate the confirmed state, such as by color and/or icon.

In another embodiment, certain data may not be altered. For example, if all emails from a particular party are deemed to be privileged, then an email from that party, may be identified as privileged (e.g., check box associated with privilege 2032) set and fixed. In another embodiment, a user may require authorization or obtain such authorization, in order to changed fixed attributes.

FIGS. 21-30 depict processes 2100-3000, inclusive and respectively. Any one or more processes 2100-3000 and/or modules 3002-3014 may be implemented by processor 1816 executing instructions as a portion of system 1800 or portions thereof, such as server 1808 and/or computing device 1804. In another embodiment, data may be maintained on an external data storage and/or processing service, such as a "cloud" processor (e.g., Amazon Web Services, Microsoft Azure, etc.), which is preferably encrypted in transmission (to and from) and in while in "cloud" storage. As a benefit, access to unencrypted data is prevented, absent an authorized password or other decryption key. For example, personnel having access to server 1800 would not have access to data, or at least unencrypted data, comprising discovery documents.

Figure 21:
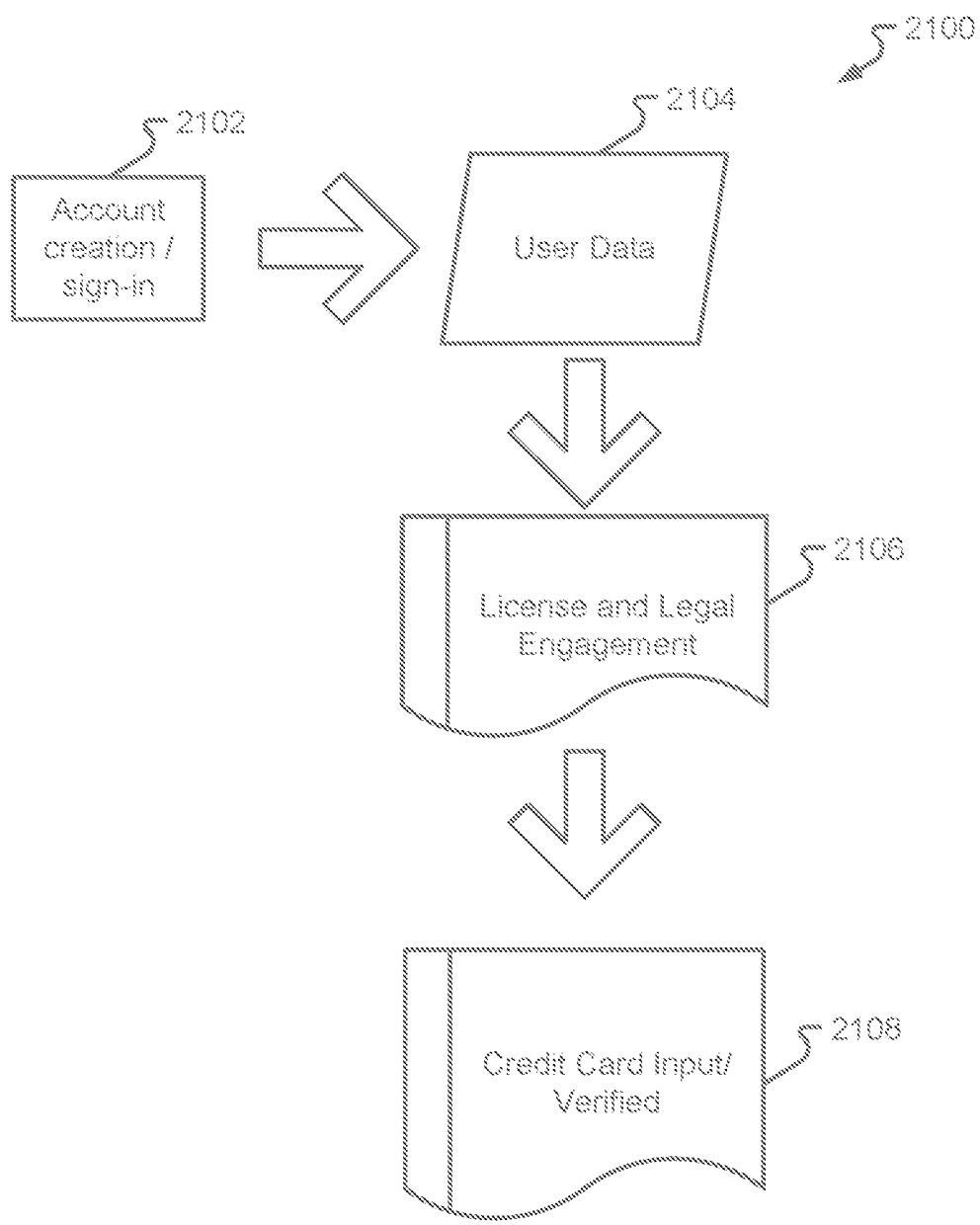
FIG. 21 depicts a process flow in accordance with embodiments of the present disclosure.

FIG. 21 depicts process flow 2100 in accordance with embodiments of the present disclosure. In one embodiment, step 2102 is a user sign-in and, if not already created, account creation as a prerequisite to sign-in to a system, such as system 1800. Step 2104 collects user data, step 2106 prompts and/or manages user agreements, such as between the user of the system and the system provider, such as an owner, operator, or service provider of system 1800 or of at least server 1808 (e.g., Discovery Genie). Payment information is received and processed, via a credit card processor (not shown), in step 2108.

Figure 22:
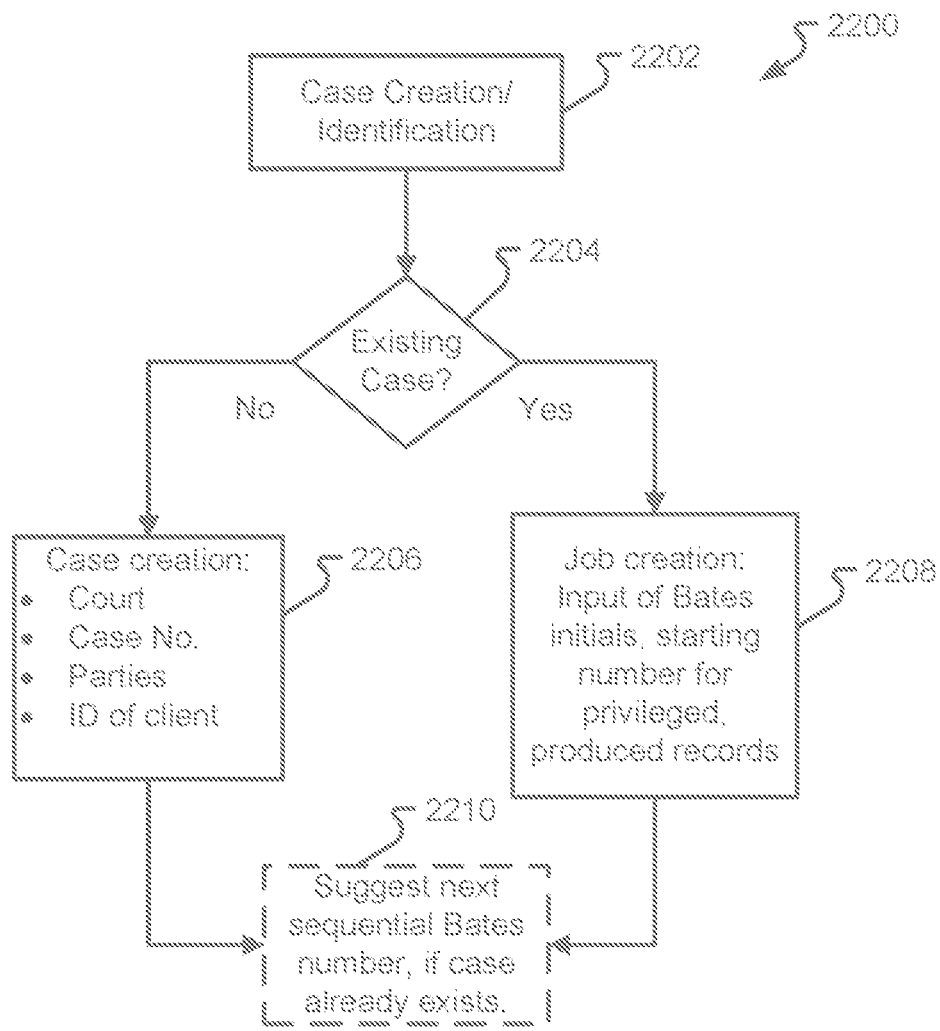
FIG. 22 depicts a case/job creation process flow in accordance with embodiments of the present disclosure.

FIG. 22 depicts case/job creation process flow 2200 in accordance with embodiments of the present disclosure. In one embodiment, step 2202 receives a selection of a case, which may be created if not already in existence. Step 2204 determines if the case exits and, if no, step 2206 executes which creates the case comprising data elements, such as court, case number, party identities, and/or client identifier. If step 2204 is determined in the affirmative, step 2208 creates the job (e.g., a discrete submission of electronic data for processing). A user may provide a Bates number prefix for records that will be marked as privileged and/or produced. Step 2210 may prepopulate a Bates number with a next sequential Bates number.

Figure 23:
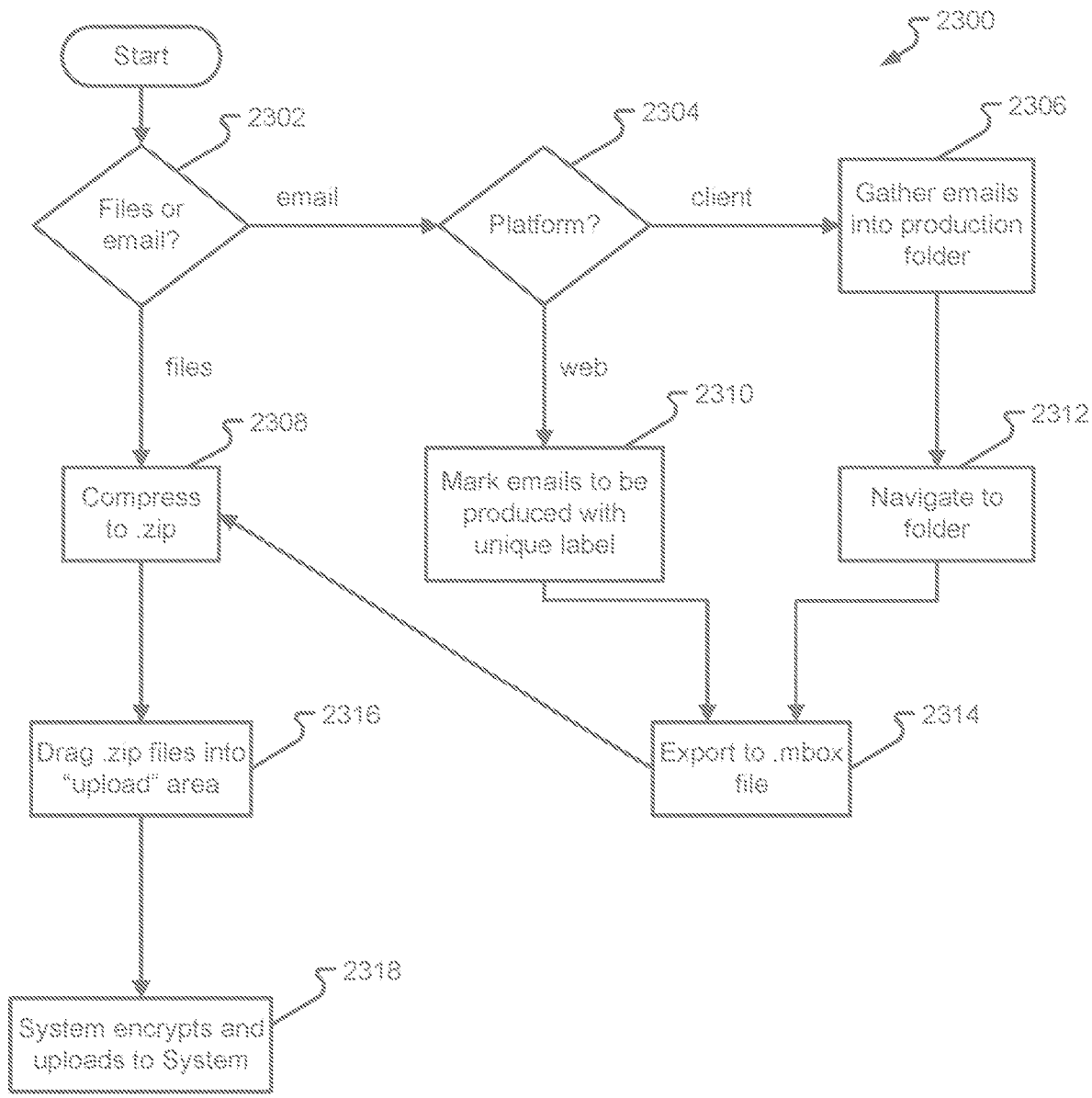
FIG. 23 depicts an upload process flow in accordance with embodiments of the present disclosure.

FIG. 23 depicts upload process flow 2300 in accordance with embodiments of the present disclosure. In one embodiment, step 2302 evaluates the record to determine if they are files, such as documents, or emails. If email, processing continues to step 2304 where the platform is determined. If the platform is "client" wherein the email is stored locally to a machine, such as computing platform 1804 via internal or attached storage for use by an application executing on the machine (e.g., Outlook, Apple Mail, Thunderbird, etc.), and processing continues to step 2306 wherein emails are gathered into a production folder. Processing then proceeds to step 2312 which presents the contents of the folder indexing or holding the gathered emails. If step 2304 determines the emails are "web", wherein emails are stored on a server of an email service provider (e.g., gmail, hotmail, etc.), processing continues to step 2310 whereby emails will be marked to be produced with a unique label. Step s2310 and 2312 may then precede step 2314 which export the emails to a ".mbox" file.

In another embodiment, step 2302 when determined to be "files" precedes step 2308 which compresses the file, such as into a ".zip" file. Step 2308 may also compress the ".mbox" file into a ".zip" file. Step 2316 then allows the user to drag the ".zip" file into an "upload" area for uploading by step 2318 wherein the encrypted and compressed file is uploaded to the system, such as for storage in storage 1836, which may be embodied as a web-based "cloud" storage system.

Figure 24:
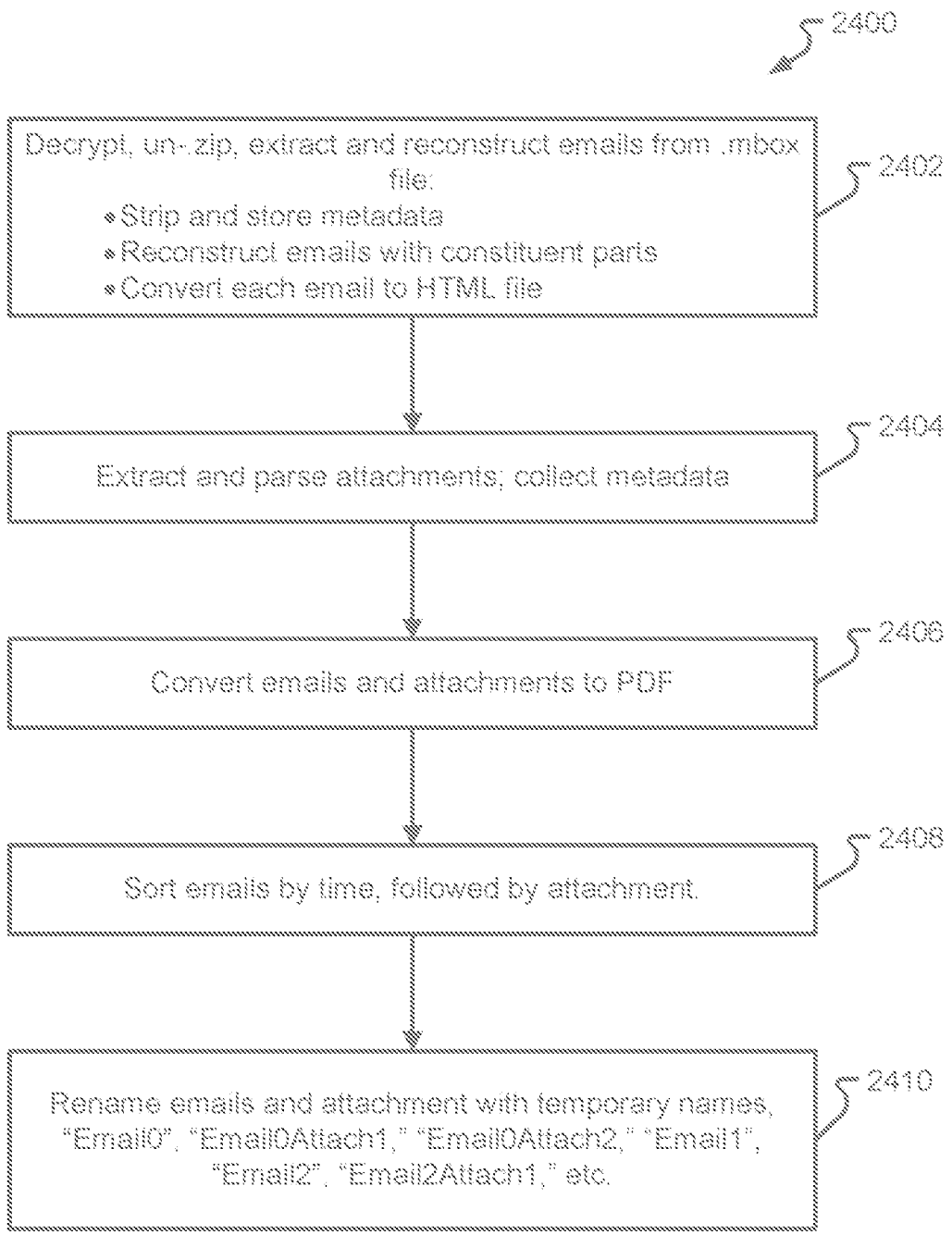
FIG. 24 depicts an email preprocessing process flow in accordance with embodiments of the present disclosure.

FIG. 24 depicts email preprocessing process flow 2400 in accordance with embodiments of the present disclosure. In one embodiment, process 2400 preprocesses emails such as by extracting from the ".mbox" file in step 2404 and decrypting, uncompressing, or otherwise allowing the email to be in a readable form in step 2402. Step 2402 may strip and storing metadata from each email and convert emails to HTML format. Emails comprising a number of parts (e.g., attachments, embedded portions, etc.) may be reconstructed. In one embodiment, an email parser, such as MHonArc, may be utilized for the conversion to HTML.

In another embodiment, one or more metadata (e.g., To, From, CC, Date, Subject) may be stripped and stored in the privileged or production log and may further be converted to an HTML header. Step 2404 may reconstruct emails into HTML-format files. Emails may be reconstructed such as by one or more of, reconstruction of the header, body, signature, embedded graphics, the identification and labeling of attachments in body of email, and the saving as an HTML file.

Step 2406 converts the emails, in HTML format, into PDF format. Emails may be sorted by time and sub-sorted by attachment in step 2408. Step 2410 renames and saves emails, which may comprise the use of a standardized naming format (e.g., "email01.pdf", "email02.pdf", "attachment1.pdf", "attachment2.pdf." etc.).

Figure 25:
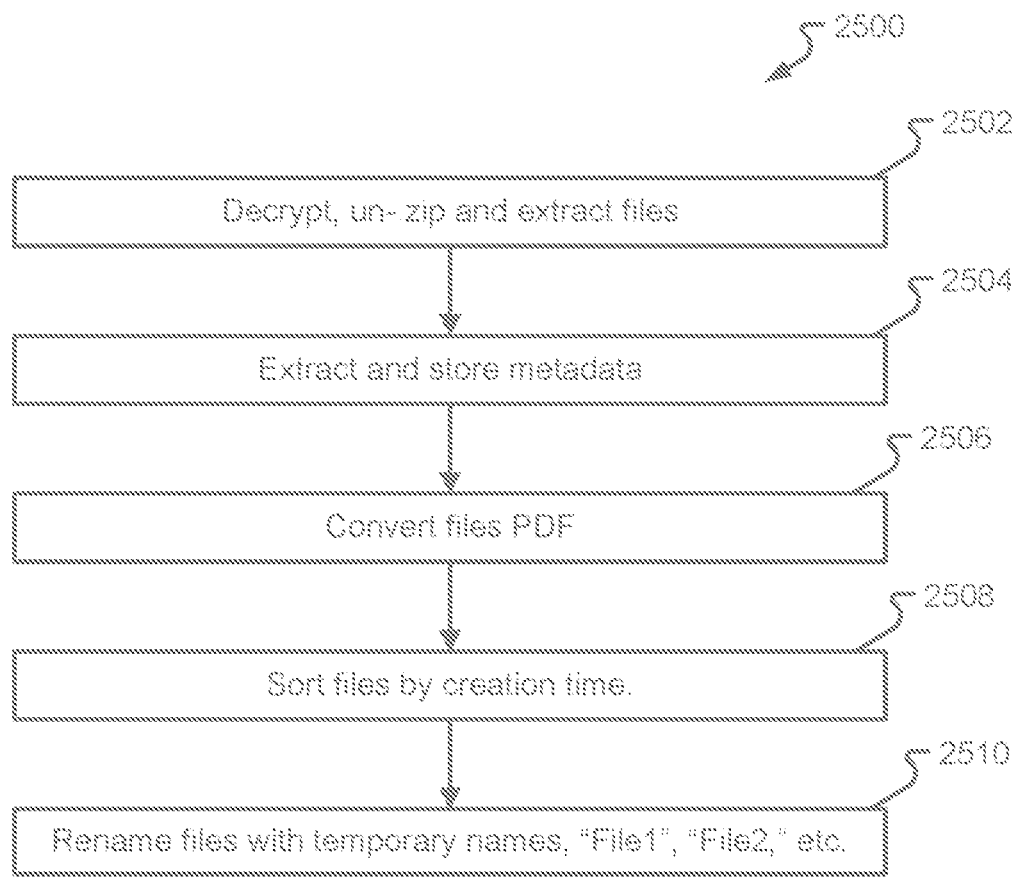
FIG. 25 depicts a file preprocessing process flow in accordance with embodiments of the present disclosure.

FIG. 25 depicts file preprocessing process flow 2500 in accordance with embodiments of the present disclosure. In one embodiment, process 2500 extracts metadata from document files (e.g., filename, creation data, file type, etc.) and stores the metadata in the privileged or production log accordingly and/or makes the stored data available for subsequent processing. Step 2502 decrypts, de-compresses, and extracts the files. Step 2404 extracts and stores the metadata. Step 2506 converts the files to PDF formatio. Step 2508 sorts the files by creation time. Step 2510 renames the files with temporary file names (e.g., "File1", "File2", etc.).

Figure 26:
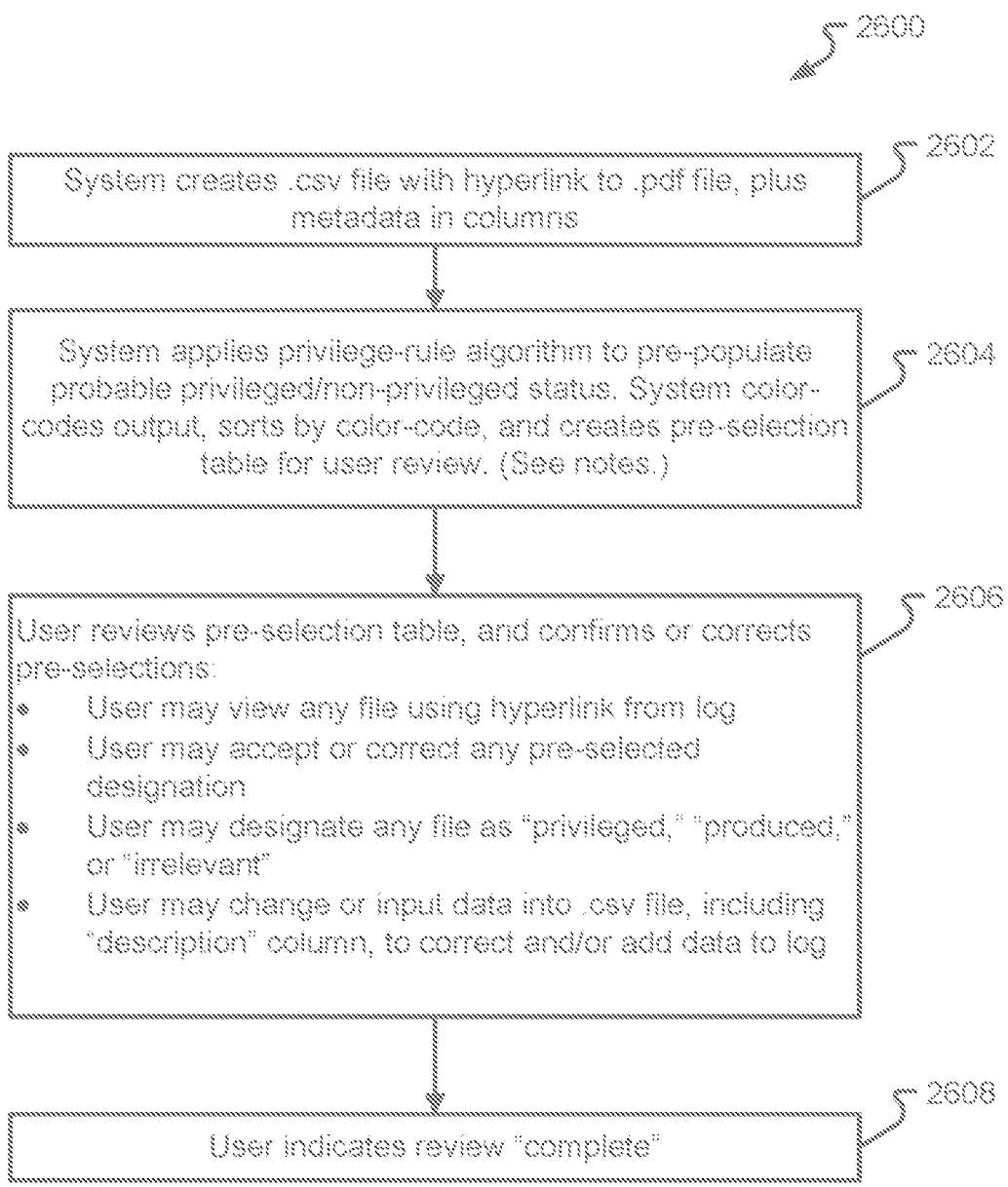
FIG. 26 depicts a privilege review process flow in accordance with embodiments of the present disclosure.

FIG. 26 depicts privilege review process flow 2600 in accordance with embodiments of the present disclosure. In one embodiment, in step 2602, system 1800 creates ".csv" (Excel-compatible) table with (a) hyperlinks to preprocessed .pdf files, plus (b) metadata from preprocessed files. For emails: User labels email addresses as "client," "lawyer," "consultant," "adversary," "third-party"; default is "third-party"

Step 2604, executes a privilege-rule algorithm, which may comprise any one or more of:

Test for "adversary" in any field—presumption, non-privileged. Mark, such as with a color (e.g., green), to indicate a presumption to produce.

Test for "attorney" in "To" or "From" field, plus "client" in opposite field. Mark, such as with a color (e.g., red), to indicate a presumption of privilege.

Test for "consultant" in "To" or "From" field, plus "client" in opposite field. Mark, such as with a color (e.g., orange) to indicate a presumption of likely privileged.

Test for "third-party" in any field. Mark, such as with a color (e.g., light green) to indicate a presumption of likely not privileged.

Test for email entirely between "attorneys" and/or "consultants". Mark, such as with a color (e.g., red) to indicate a presumption of privilege.

Test for "client" in all fields. Mark yellow, i.e., possibly produced.

Test for "client" in "To" and "From", and "attorney" or "consultant" in "CC". Mark, such as with a color (e.g., light orange) to indicate a possibility of privileged.

Sort by designated marker, such as color, when used. The results may then be presented on a display for presentation to a user in step 2606

Step 2606 presents the results to the user. Step 2606 may present the data with selection of "privileged" or "non-privileged" prepopulated per algorithm. The user may then confirms/corrects designation, using hyperlink to view document, and radio buttons to indicate correct classification. The user has the option to designate any file as "non-produced," i.e., irrelevant and neither produced nor privileged.

User hits "Complete" button to complete classification process, which is received in step 2608.

Figure 27:
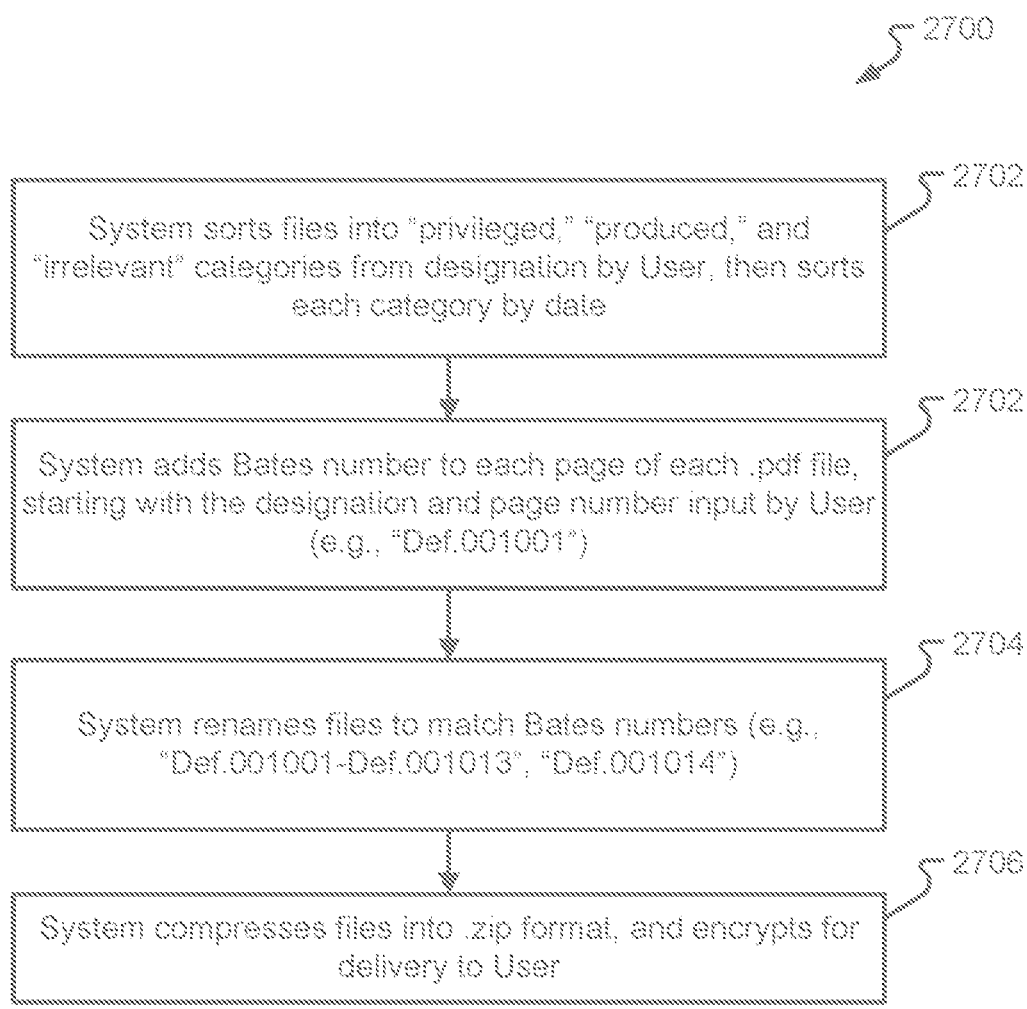
FIG. 27 depicts a file delivery process flow in accordance with embodiments of the present disclosure.

FIG. 27 depicts file delivery process flow 2700 in accordance with embodiments of the present disclosure. In one embodiment, step 2702 provides files sorted into categories for production, privilege, irrelevant, and/or other designation. Step 2702 adds Bates numbers to the PDF files. Step 2704 renames the file to reflect the Bates numbering. Step 2706 compresses and encrypts the file for delivery to the user.

Figure 28:
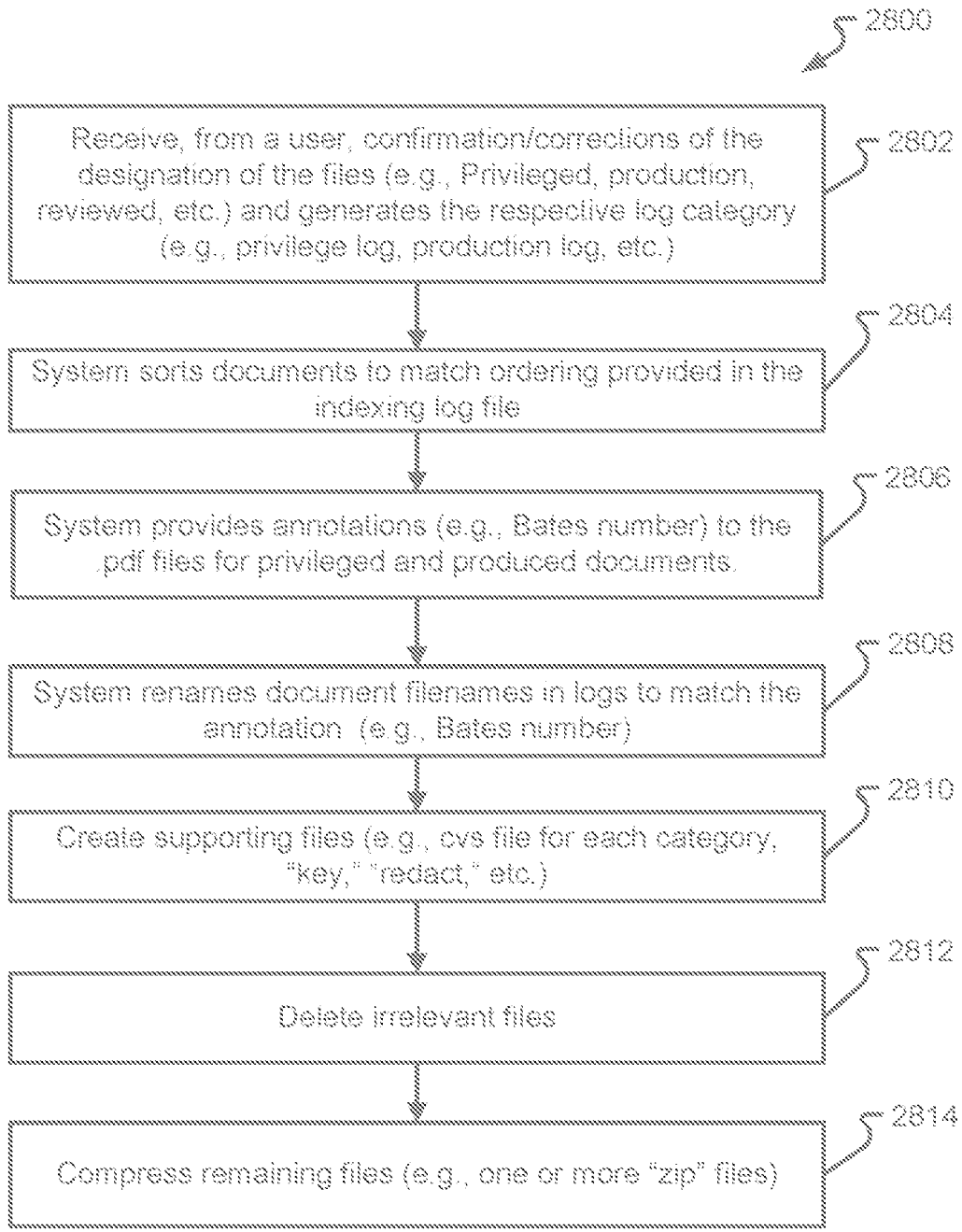
FIG. 28 depicts privilege and production log completion process flow in accordance with embodiments of the present disclosure.

FIG. 28 depicts privilege and production log completion process flow 2800 in accordance with embodiments of the present disclosure. In one embodiment, step 2802 receives an indication the user has completed processing by confirming or, if necessary, correcting the processor (e.g., processor 1816) provided designations. Step 2804 sorts documents by their corresponding order provided in the respective log file. For example, all "production" documents are sorted into the order provided by the production log. Step 2806 provides annotations, such as the Bates numbers originating with the designated prefix. Step 2808 then renames the files to correspond to their respective Bates number. Supporting documents are created in step 2810, such as a file, such as in .cvs format, for each log (e.g., privilege log, production log and reviewed log). Step 2812 deletes irrelevant files, such as those absent on a production or privileged log, such that the space utilized to store such irrelevant files, such as on storage 1836 and/or memory 1820, may be made available for other uses. Step 2814 then applies compresses, such as into a single or plurality of .zip files and optionally applies an encryption before or after compression, and the compressed files are then available for uploading to the user, such as by following a generated or provided link.

Figure 29:
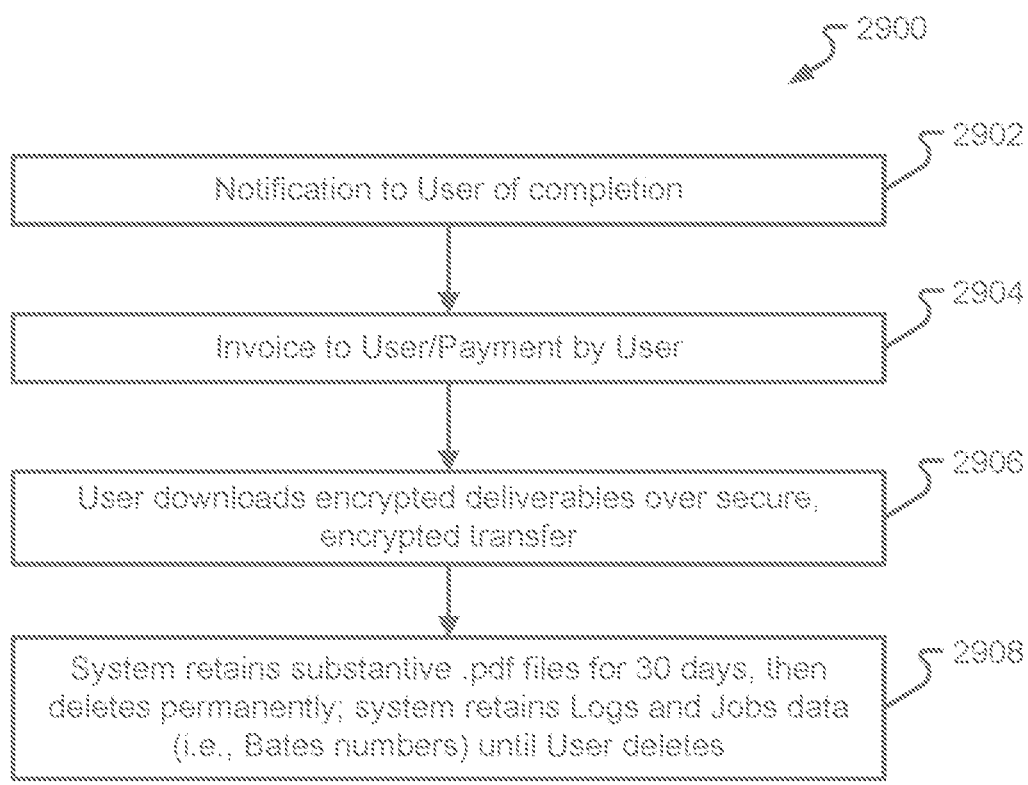
FIG. 29 depicts a payment, data retrieval, and data retention process flow in accordance with embodiments of the present disclosure.

FIG. 29 depicts payment, data retrieval, and data retention process flow 2900 in accordance with embodiments of the present disclosure. In one embodiment, step 2902 formats and/or sends a notification to a user (e.g., to computing device 1804). Step 2904 initiates invoicing/payment processing. Step 2906 provides a link or other means by which a user may download encrypted deliverables. Step 2908 causes pdfs to be stored and marked for automatic deletion, such as upon passage of 30-days. Logs may be retained until a user initiates deletion, or deleted based on system rules, such as within 180 days.

Figure 30:
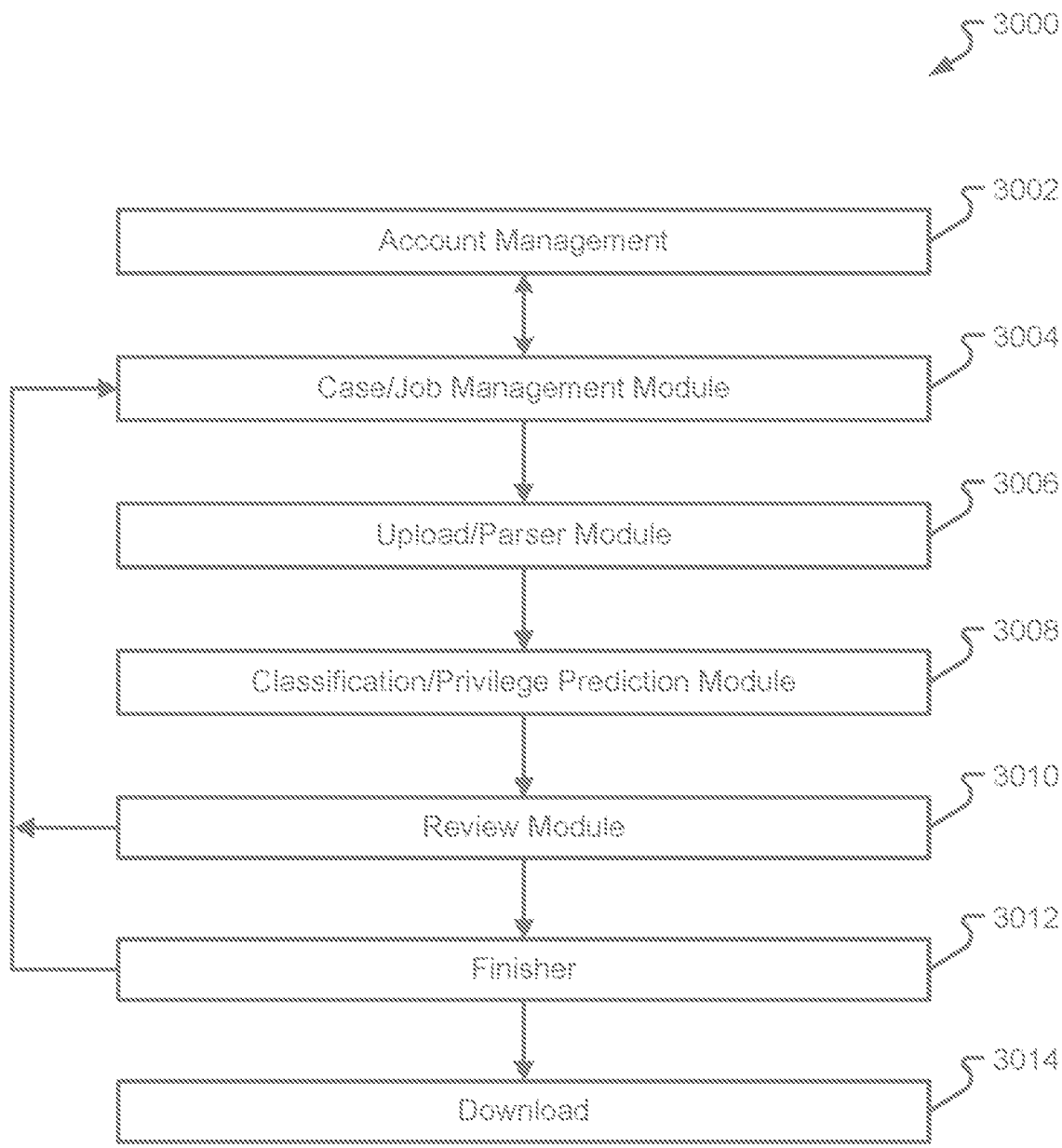
FIG. 30 depicts overview process flow in accordance with embodiments of the present disclosure.

FIG. 30 depicts overview process flow 3000 in accordance with embodiments of the present disclosure. In one embodiment, account management block 3002 manages the user's account, such as names, firm, roles, etc. case/job management module 3004 creates and relates cases to the user account and firm and relates jobs to a particular case. Upload/parser module 3006 accepts the upload of data archives from the user and processes the data (i) to use selected data to create an interim image of the final document, and then (ii) convert that image to a final form, such as PDF. Data is related to a particular job.

Classification/Prediction Module 3008 receives metadata from Parser 3006, and, upon input from the user, applies an algorithm to predict likelihood of privilege. Data related to the case is retained. The review module 3010 receives input from the user, including instructions to modify PDFs. The Finisher 3912 applies the user's input to modify the PDFs by adding Bates numbers, custom stamps, and/or discarding irrelevant files, and generates one or more logs. The user downloads output in download block 3014.

In another embodiment, a processor, such as processor 1816, may perform embodiments disclosed herein upon retrieving from storage 1836 and/or memory 1820 one or more modules comprising machine-executable instructions for processor 1816 the execution of the instructions being the execution of the one or more modules, which may include an account management module 3002, a case/job management module 3004, upload/parser module 3004, classification/privilege prediction module 3008, review module 3010, finisher module 3012, and/or download module 3014.

Account Management Module 3002: The account management module 3002 contains user data, including the user's firm/organization. The firm/organization designation enables case and job sharing among users belonging to the same firm/organization. Account management module 3002 may also maintain billing and payment information, as well as custom pricing, if applicable, for the firm, organization, and/or user.

Case/Job Management Module 3004: The case/job management module 3004 manages cases, and relates each case to a user, and, if the "owner" of the case directs, to other users and/or the user's firm. This permits the sharing of cases between one or more users. Case/job management module 3004 also manages jobs, which are related to a case, and are also related to a user, as well as other users who have permissions to the case. Case/job management module 3004 may also allow the user to create a job by causing the generation of an email request (sent by the system) to a client, to permit the client to upload the raw data using the upload parser module 3006; once received and processed, the job is processed for (and with the input from) the user who originally created the job.

Upload/Parser Module 3006: The upload/parser module 3006 accepts from the user the upload of raw data, such as archives of electronic communications or archives of electronic documents which may be stored in a temporary storage (e.g., one or more of storage 1836, memory 1820, etc.). Following receipt of the upload, the upload/parser module 3006 performs a number of steps to manage, streamline, and convert the raw data:

A) For archives of electronic communications, the upload/parser module 3006:

Selects certain metadata for storage (e.g., in one or more of storage 1836, memory 1820) in one or more format structures:

Metadata usable for additional jobs within the same case, such as email addresses is retained and stored, and related to the case and the job.

Metadata identifying the message itself (message ID) is temporarily stored for future use.

Metadata usable only for the instant Job, such as Subject, Date, To, From, CC, BCC is retained, while other metadata, such as routing and server information, is extracted from the raw data and deleted.

Tests each email using the message ID previously retained to test for duplicates. If duplicate email messages are found, one copy is retained, and all others are deleted.

Scans the raw data of electronic communications for attachments, such as electronic documents. The content disposition of such attachments, i.e., "inline" or "attachment," is analyzed. Each attachment is compared to a list of common system-generated names, and attachments meeting certain criteria are further processed to eliminate generation of certain attachments (such as email signatures, inline links to external sources, etc.) as standalone attachment documents.

Constructs an interim representation of an email in an interim format, such as HTML, to create the header, body, inline attachments, and list of attachments in a format recognizable to the user as an email. The raw data used to construct the HTML representation is deleted.

Converts the interim representation of the email to PDF. The data consisting of the interim HTML representation is deleted. Also relates the email, in PDF format, to the job and causes the email to be stored (e.g., in one or more of storage 1836, memory 1820) for further processing.

Applies a unique name to the PDF representation of the email to identify the PDF file unambiguously (e.g., unique to a job and/or user).

Converts attachments designated as true attachments, as opposed to inline attachments to PDF, and relates the PDF to the PDF form of the email to which they are attachments. Also relates the attachment in PDF form to the job and stores the attachment (e.g., in one or more of storage 1836, memory 1820) for further processing.

For attachments that are already in PDF format, the system converts the received PDF to a uniform size with a correct orientation. The original PDF data is deleted.

Applies a unique name to the converted PDF for unambiguously identification.

B) For archives of electronic documents, the upload/parser module 3006:

Selects certain metadata, such as filename, file path, last date modified, and other metadata usable for additional jobs for storage (e.g., in one or more of storage 1836, memory 1820) for further processing. Other metadata, such as user notes or other metadata, is deleted.

Electronic documents are converted to PDF format.

For documents that cannot be converted to PDF, such as .mp3 files, the original file format is retained.

For attachments that were received in PDF format, the system converts the received PDF to a uniform size with a correct orientation. The original PDF data is deleted.

After conversion to PDF, the original raw data used to create such PDFs is deleted.

Applies a unique name to the converted PDF for unambiguous identification (e.g., job unique, user unique, etc.).

C) Metadata to be used for further processing, plus the PDFs generated by the upload/parser module 3006 are stored for further processing by other modules.

D) Following processing of the raw data by the Parser, the original raw data received from the user is deleted.

Classification/Privilege Prediction Module 3008: The classification/privilege module 3008 retrieves metadata, such as email addresses, stored by the upload/parser module 3006, and causes the retrieved metadata to be presented for user input. Specifically, the user classifies the metadata, such as email addresses, according to the role the owner of the address plays in the litigation, such as attorney, client, adverse party, or third party. The user input is related to the metadata, related to the case and the job, and stored for future jobs within the case, and also stored for additional processing within the same job. If a user declines to classify any particular email address, the system 1800 assigns the address a default value, such as third party. When the user completes the classification process, the classification/privilege module 3008 performs the following steps:

Creates a list of every email address within the job, and stores with each email address the classification assigned by the user in the classification module.

Retrieves the metadata stored by the parser consisting of the email addresses contained in the To, From, CC and BCC fields.

Compares the email addresses found in the various To, From, CC and BCC fields against a template of discovery rules stored by the system, which classifies each email into the following predicted privilege categories: Very Likely Privileged, Likely Privileged, Possibly Produced, Likely Produced, and Very Likely Produced. The predicted value for each email is associated with the email and the metadata for that email, stored for future use.

Review Module 3010: The Review Module 3010 retrieves (a) the metadata stored for each email and attachment (or, in the case of an archive of electronic documents, the metadata stored for each such document), and (b) the predicted privilege value for each item for display to the user and to receive an associated input. At the direction of the user, the system 1800 retrieves the PDF of the selected email, attachment or electronic document for presentation on a user device for receiving an input from the user upon review. The user classifies the item into one of three categories: Privileged, Produced or Irrelevant. This category is related to the item and stored. The user may also provide additional data, such as notes, designation as "key," designation as "Stamp" (i.e., to have the custom stamp designated by the User, such as "Confidential," added to the final PDF), and/or designation for future redaction. All such input is related to the selected item and stored.

In some embodiments, the review module 3010 permits the user to "split" an item, i.e., split the PDF into two PDFs. In this situation, while viewing the image of the PDF, indicate where (such as, for example, between pages 3 and 4 of an original PDF) to split the PDF into two sections. The original filename associated with the item will continue to be associated with the first PDF, while the User is prompted to input a new filename for the second PDF. The new "split" PDFs are then related to the user and the job and stored; the original PDF (i.e., before the user split the original PDF into two new PDFs) is deleted. All other metadata applicable to the original PDF, which is already related to the first PDF, is retained; such metadata is duplicated and a copy of such metadata is associated with the second PDF. The user may split a PDF multiple times.

Finisher Module 3012: The finisher module 3012 retrieves information related to the job, such as the Bates prefix selected by the user, the next number in the Bates series (both privileged and produced), and the text for the custom stamp input by the user. The finisher module 3012 causes the display of stored data to the user and accepts any modifications by the user, and then stores the result. The finisher module 3012 then retrieves (a) the PDFs for each item in the job, (b) the classification (Privileged, Produced or Irrelevant) for each item, and (c) the other data input by the user in the review module 3010. The finisher module 3012 then sorts all items, first according to classification (Privileged, Produced or Irrelevant), then, for Privileged and Produced, by the date metadata of the email, or the date metadata of the document. Attachments to emails are placed in sequence after the email to which they are attached. The finisher module 3012 then processes each PDF to add the appropriate Bates number and (if applicable) custom stamp to each Privileged and Produced record. The finisher module 3012 deletes the PDFs for records designated as "Irrelevant." The Finisher then renames each PDF (or, if the original file format was retained because the item could not be converted to PDF, the original file) by the Bates prefix and numbers, such as "Def.1001-1003." The finisher module 3012 then retrieves the metadata for each item and uses that metadata to generate one or more logs, such as a privilege log, a "production log," and/or a "key document log." The finisher module 3012 may generate additional logs with hyperlinks linking the filename in the log to the PDF file.

The finisher module 3012 then places the PDFs and logs into appropriate electronic folders and subfolders, and then compresses the entire output into a final output .zip file, which is related to the Job and stored. Except for metadata stored for future jobs and data related to the job itself (number of produced/privileged/irrelevant files processed, number of pages, date and time job was completed, cost), the PDFs and metadata used to generate the logs is deleted.

Download Module 3014: The download module 3014 causes a notification to be created and transmitted to a device (e.g., computing device 1804) to notify the user that the job is ready for download, and establishes, if necessary, and provides a link to permit the user to retrieve the final output .zip folder. When the user activates the download link, the final output .zip file is transmitted to the user, and the date and time of the initial download is stored. The system 1800 monitors the date and time of the initial download of each job; for a certain period of time designated by the system, the User may retrieve as many copies of the final output .zip file, after which the final output .zip file is deleted from the system.

While the above-described flowcharts and state diagrams have been discussed in relation to a particular sequence of events, it should be appreciated that changes to this sequence can occur without materially affecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

Furthermore, the disclosed methods may be readily implemented in software, which are a constrained set of instructions for conversion to machine code executable by a processor(s), or comprise a using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods, and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, one or more portions of the disclosed methods may be readily implemented in software that can be stored on a storage medium, executed on a programmed general-purpose computer with the cooperation of a controller and memory, a special purpose computer, a microprocessor, or the like. The system can also be implemented by physically incorporating the system and/or method into a software and/or hardware system, such as the hardware and software systems of a communications device or system.

What is claimed is:

1. A method for document compaction, comprising:
receiving a set of electronic documents, wherein one or more electronic documents includes an attached electronic document;

extracting and storing metadata associated with each electronic document of the set of electronic documents including the attached electronic document;

parsing the metadata to extract information identifying a sender and a receiver;

reconstructing and converting each electronic document of the set of electronic documents into a first format, wherein the first format is immutable, with respect to contents of each electronic document of the set of electronic documents;

setting a file name for each electronic document of the set of electronic documents to indicate an order in an ordered relationship (a) between each electronic document of the set of electronic documents and (b) between one or more electronic documents of the set of electronic documents and the attached electronic document and wherein the order comprises a number ordering of the set of electronic documents;

classifying each electronic document of the set of electronic documents as based on the extracted and stored metadata;

grouping similar electronic documents in the first format based on a classification; and providing a grouping of similar electronic documents, together with one or more document logs identifying each document in the grouping of similar electronic documents, to a user.

2. The method of claim 1, further comprising:
storing the grouping of similar electronic documents identified as producible, and absent members of the set of electronic documents identified as privileged, in a data storage.

3. The method of claim 1, wherein:
the first format is immutable, with respect to the contents of each electronic document of the set of electronic documents and annotatable without changing the contents thereof: and reconstructing and converting further comprises annotating each electronic document of the set of electronic documents comprising providing Bates numbering on each document page of each electronic document of the electronic documents.

4. The method of claim 1, wherein: the first format is immutable, with respect to the contents of each electronic document of the set of electronic documents and annotatable without changing the contents thereof; and reconstructing and converting further comprises annotating each electronic document of the set of electronic documents comprising providing a confidentiality indicator on each document page of each electronic document of the electronic documents identified as confidential.

5. The method of claim 1, wherein:
the extracted and stored metadata comprises a role associated with one of the sender or the recipient of one of the one or more electronic documents, when the one of the one or more electronic documents is a communication; and the communication is at least one of a group of communication types comprising an email, a text message, a multimedia message, and a social media message.

6. The method of claim 1, further comprising:
receiving a user input indicating a reclassification and a target document; and reclassifying the target document, comprising at least one electronic document of the set of electronic documents as privileged or producible based on the user input.

7. The method of claim 1, further comprising:
reconstructing and converting each electronic document of the set of electronic documents into the first format, wherein the reconstruction and converting maintains the ordering between the one or more electronic documents and the attached electronic document identified as producible and not identified as privileged.

8. The method of claim 1, wherein providing the grouping of similar electronic documents to the user further comprises encrypting the grouping of similar electronic documents.

9. A method for document management, comprising:
receiving an electronic document;
extracting and storing metadata associated with the electronic document;
reconstructing and converting the electronic document into a first format wherein the first format is immutable, with respect to contents of the electronic document;
setting a file name for the electronic document to indicate an order in an ordered relationship (a) between the electronic document and a set of electronic documents and (b) between the electronic document and an attached electronic document, wherein the attached electronic document is an attachment to the electronic document and wherein the order comprises a date ordering of the set of electronic documents;
classifying the electronic document based on the extracted and stored metadata; and
providing the classified electronic document, together with a document log identifying the electronic document, to a user.

10. The method of claim 9, wherein:
receiving of the electronic document further comprises receiving the set of electronic documents;
extracting and storing of the metadata associated with the electronic document further comprises extracting and storing metadata associated with each electronic document of the set of electronic documents;
reconstructing and converting of the electronic document into the first format comprises reconstructing and converting each electronic document of the set of electronic documents into the first format;
classifying of the electronic document as one of privileged or producible based on the extracted and stored metadata comprises classifying each electronic document of the set of electronic documents as privileged or producible based on the extracted and stored metadata;
grouping similar electronic documents in the first format based on a privilege and producibility classification; and
providing of the electronic document, together with document log identifying the electronic document, to a user comprises providing the grouping of similar electronic documents, together with one or more document logs identifying each document in the grouping of similar electronic documents, to the user.

11. The method of claim 9, further comprising storing the grouping of similar electronic documents identified as producible, and absent members of the set of electronic documents identified as privileged, in a data storage.

12. The method of claim 9, wherein reconstructing and converting each electronic document of the set of electronic documents into the first format, further comprises converting the electronic documents, having a plurality of file types, into a single file type.

13. A system for document management, comprising:
a processor with a communication interface; and
a data repository accessible, via the communication interface, to the processor;

wherein the processor:
  receives an electronic document;
  extracts and stores metadata associated with the electronic document;
  reconstructs and converts the electronic document into a first format wherein the first format is immutable, with respect to contents of each electronic document of a set of electronic documents;
  sets a file name for each electronic document of the set of electronic documents to indicate an order in an ordered relationship (a) between each electronic document of the set of electronic documents and (b) between a plurality of electronic documents of the set of electronic documents and an attached electronic document and wherein the order comprises one or more of a number ordering of the set of electronic documents or a date order of each electronic document of the set of electronic documents;
  classifies the electronic document based on previously extracted and stored metadata; and
  provides the electronic document, together with a document log identifying the electronic document, to a display device for viewing by a user.

14. The system of claim 13, wherein the processor:
receives the electronic document comprising receiving a set of electronic documents;
extracts and stores metadata associated with each electronic document of the set of electronic documents;
reconstructs and converts each electronic document of the set of electronic documents into the first format;
classifies each electronic document of the set of electronic documents as privileged or producible based on the extracted and stored metadata;
groups similar electronic documents in the first format based on the privilege and producibility classification; and
provides a grouping of documents, together with one or more document logs identifying each document in the grouping of documents, to the display device for viewing by the user.

15. The system of claim 14, wherein reconstructing and converting each electronic document of the set of electronic documents into a first format, further comprises converting the electronic documents, having a plurality of file types, into a single file type.

16. The system of claim 15, wherein the single file type is a portable document format (PDF).

17. The system of claim 13, wherein the extracted and stored metadata comprises a role associated with one of a sender or a recipient of one of the plurality of electronic documents, when one of the plurality of electronic documents is a communication.

18. The system of claim 17, wherein the communication is at least one of a group of communication types comprising an email, text message, multimedia message, and social media message.

19. The system of claim 13, further comprising:
  the processor further receives a user input indicating a reclassification and a target document; and
  the processor further reclassifies the target document, comprising at least one electronic document of the set of electronic documents as privileged or producible based on the user input.

20. The system of claim 13, further comprising:
the processor further reconstructs and converts each electronic document of the set of electronic documents into the first format, wherein the reconstruction and converting maintain an ordering between a plurality of electronic documents and the attached electronic document identified as producible and not identified as privileged.

* * * * *